US012666375B2

(12) United States Patent
Xia et al.

(10) Patent No.: US 12,666,375 B2
(45) Date of Patent: Jun. 23, 2026

(54) CELL ACCESS METHOD AND APPARATUS, DEVICE, AND STORAGE MEDIUM

(71) Applicant: ZTE CORPORATION, Shenzhen (CN)

(72) Inventors: Shuqiang Xia, Shenzhen (CN); Guanghui Yu, Shenzhen (CN); Feng Xie, Shenzhen (CN); Yijian Chen, Shenzhen (CN); Zhifeng Yuan, Shenzhen (CN); Liujun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 704 days.

(21) Appl. No.: 17/924,270

(22) PCT Filed: May 27, 2021

(86) PCT No.: PCT/CN2021/096223
§ 371 (c)(1),
(2) Date: Nov. 9, 2022

(87) PCT Pub. No.: WO2021/244378
PCT Pub. Date: Dec. 9, 2021

(65) Prior Publication Data
US 2023/0180156 A1      Jun. 8, 2023

(30) Foreign Application Priority Data
Jun. 5, 2020    (CN) .......................... 202010507125.9

(51) Int. Cl.
*H04W 72/04*      (2023.01)
*H04B 7/0456*      (2017.01)
(Continued)

(52) U.S. Cl.
CPC ....... *H04W 56/0015* (2013.01); *H04W 48/08* (2013.01)

(58) Field of Classification Search
CPC ............. H04W 56/0015; H04W 48/08; H04W 72/044; H04W 48/16; H04W 56/001;
(Continued)

(56) References Cited

U.S. PATENT DOCUMENTS 8,351,945 B2 *   1/2013   Lee ................... H04W 36/0055
                                              455/437
9,215,646 B2 *  12/2015   Lee ....................... H04W 76/15
(Continued)

FOREIGN PATENT DOCUMENTS

CN        101431779  A      5/2009
CN        103546980  A      1/2014
(Continued)

OTHER PUBLICATIONS

Extended European Search Report in Application No. 21817997.6, dated Jun. 7, 2024, 12 pages.
(Continued)

*Primary Examiner* — Sithu Ko
*Assistant Examiner* — Vanneilian Lalchinthang
(74) *Attorney, Agent, or Firm* — Morgan, Lewis & Bockius LLP

(57) ABSTRACT

Provided are a cell access method and apparatus, a device, and a storage medium. The cell access method is applied to a first node and includes: receiving a first synchronization signal sent by a second node in a first cell, where the first synchronization signal is used for downlink synchronization between the first node and the first cell; after the first node is downlink synchronized with the first cell, receiving first system information sent by the second node in the first cell, where the first system information carries first resource
(Continued)

The UE receives synchronization signals of one or more first cells — S31

The UE receives the system information of a downlink synchronized first cell, where the system information at least carries the indication information of a first resource required for applying for the service of a second cell — S32

The UE determine a resource required for applying for the second cell according to the received system information of the first cell and sends a first application signal on the resource — S33

The UE receives a first response signal sent by the first cell for the first application signal — S34

The UE receives a synchronization signal sent by the second cell to achieve the synchronization with the second cell — S35

The UE receives the system information that is related to the second cell and sent by the second cell — S36

The UE sends a second application signal on the resource determined in S36 to apply for obtaining the second cell — S37

The UE receives a second response signal sent by the second cell — S38 indication information, and the first resource indication information at least includes an indication for a resource required for sending a first application signal; sending the first application signal on the resource required for sending the first application signal, where the first application signal is used for requesting the second node to send first information.

15 Claims, 11 Drawing Sheets

(51) Int. Cl.

| | | |
|---|---|---|
| *H04L 5/00* | (2006.01) | |
| *H04W 48/08* | (2009.01) | |
| *H04W 56/00* | (2009.01) | |
| *H04W 76/19* | (2018.01) | |

(58) Field of Classification Search
CPC ............. H04W 72/0453; H04W 72/23; H04W 52/146; H04W 76/19; H04W 24/10; H04W 76/27; H04W 84/042; H04L 1/1812; H04L 25/021; H04B 7/0456; H04B 7/04; H04B 7/0452; H04B 17/318
USPC .......................................................... 370/350
See application file for complete search history.

(56) References Cited

U.S. PATENT DOCUMENTS

| | | | | |
|---|---|---|---|---|
| 9,859,961 B2* | 1/2018 | Onodera | .............. | H04B 7/0452 |
| 11,864,014 B2* | 1/2024 | Sang | ................. | H04W 36/0094 |
| 11,916,623 B2* | 2/2024 | Frenger | ................. | H04L 5/0048 |
| 12,096,433 B2* | 9/2024 | Xu | ......................... | H04L 5/0094 |
| 2013/0272258 A1* | 10/2013 | Lee | ....................... | H04L 1/1861 |
| | | | | 370/329 |

| | | | | |
|---|---|---|---|---|
| 2015/0085788 A1* | 3/2015 | Kim | ...................... | H04L 5/0055 |
| | | | | 370/329 |
| 2016/0095076 A1* | 3/2016 | Xiong | ................... | H04L 5/0053 |
| | | | | 370/336 |
| 2019/0021076 A1* | 1/2019 | Zhang | ................... | H04L 1/1812 |
| 2019/0021976 A1* | 1/2019 | Kim | ...................... | A61K 8/4973 |
| 2019/0261356 A1* | 8/2019 | Myung | ................. | H04W 48/12 |
| 2020/0195383 A1* | 6/2020 | Liu | ......................... | H04L 1/189 |
| 2023/0156574 A1* | 5/2023 | Liu | ...................... | H04W 74/002 |
| | | | | 455/434 |

FOREIGN PATENT DOCUMENTS

| | | | |
|---|---|---|---|
| CN | 104105149 A | 10/2014 | |
| CN | 106961713 A | 7/2017 | |
| CN | 107371176 A | 11/2017 | |
| CN | 110035472 A | 7/2019 | |
| CN | 111901848 A | 11/2020 | |
| JP | 2016119496 A | 6/2016 | |
| KR | 101387545 B1 | 4/2014 | |
| WO | WO2014059591 A1 | 4/2014 | |
| WO | WO2019233119 A1 | 12/2019 | |

OTHER PUBLICATIONS

International Search Report in Application No. PCT/CN2021/096223, dated Aug. 9, 2021, 4 pages, including English translation.
Office Action in Chinese Application No. 202010507125.9, dated Aug. 23, 2024, 12 pages including translation.
Search Report in Chinese Application No. 202010507125.9, dated Aug. 23, 2024, 8 pages including translation.
Office Action for Japanese Application No. 2022-574800, dated Oct. 17, 2023, 8 pages including translation.
Marcus Karlsson et al., "Techniques for System Information Broadcast in Cell-Free Massive MIMO", IEEE Transactions On Communications, vol. 67, No. Jan. 29, 2019, pp. 1-30.

* cited by examiner

Figures 1, 2:
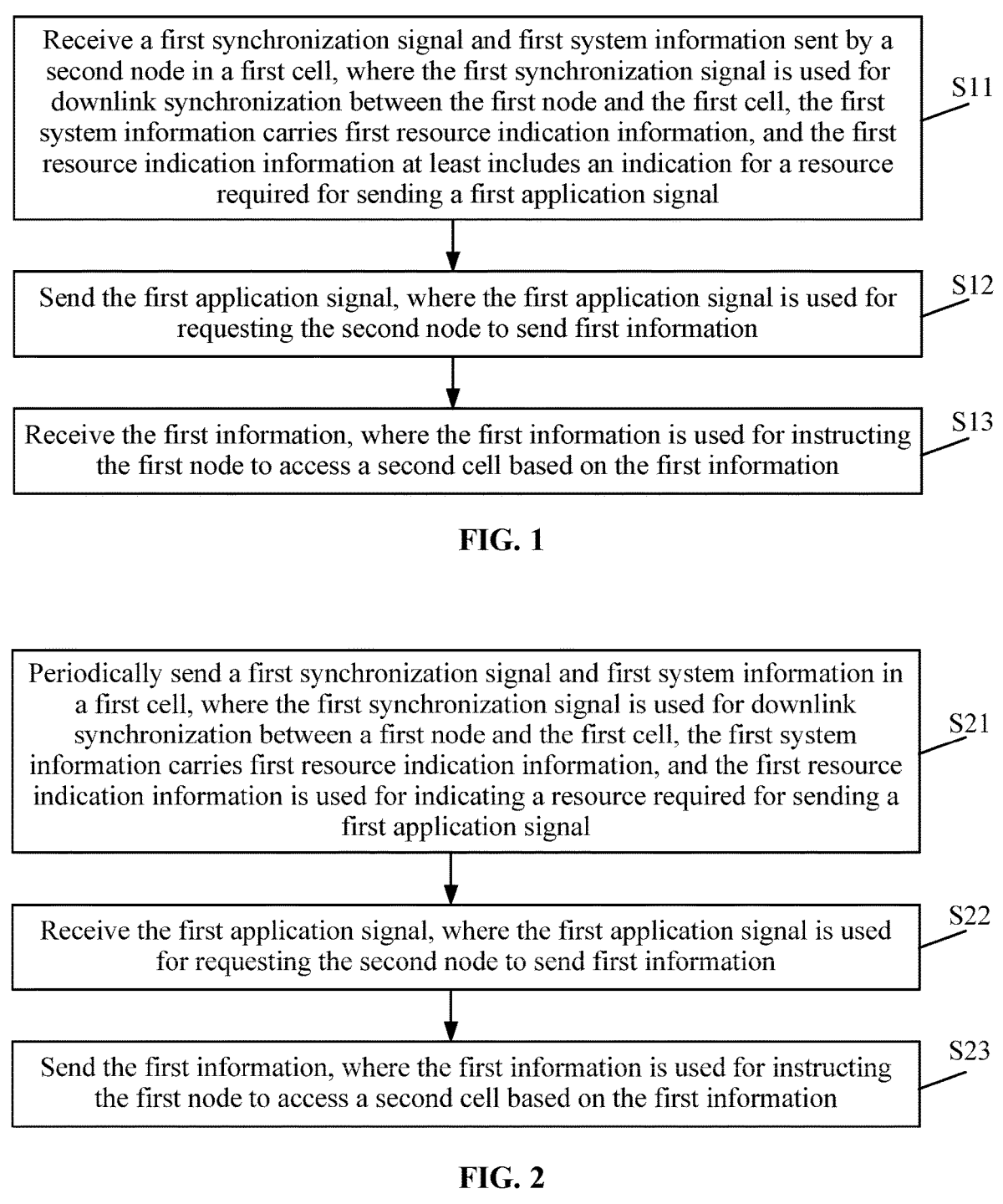

Receive a first synchronization signal and first system information sent by a second node in a first cell, where the first synchronization signal is used for downlink synchronization between the first node and the first cell, the first system information carries first resource indication information, and the first resource indication information at least includes an indication for a resource required for sending a first application signal

S11

Send the first application signal, where the first application signal is used for requesting the second node to send first information

S12

Receive the first information, where the first information is used for instructing the first node to access a second cell based on the first information

Periodically send a first synchronization signal and first system information in a first cell, where the first synchronization signal is used for downlink synchronization between a first node and the first cell, the first system information carries first resource indication information, and the first resource indication information is used for indicating a resource required for sending a first application signal

S21

Receive the first application signal, where the first application signal is used for requesting the second node to send first information

S22

Send the first information, where the first information is used for instructing the first node to access a second cell based on the first information

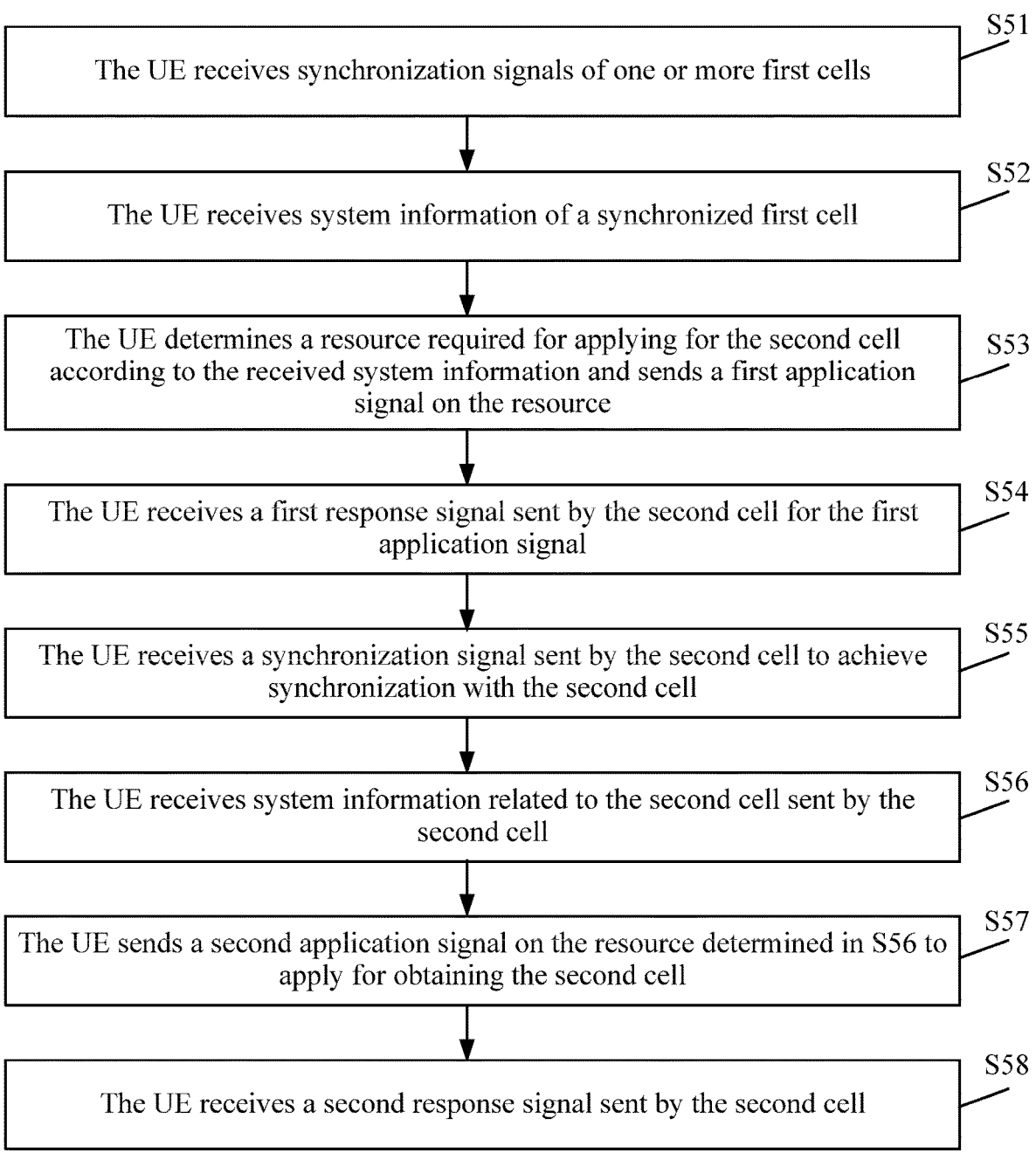

The UE receives synchronization signals of one or more first cells ⌐ S51

The UE receives system information of a synchronized first cell ⌐ S52

The UE determines a resource required for applying for the second cell according to the received system information and sends a first application signal on the resource ⌐ S53

The UE receives a first response signal sent by the second cell for the first application signal ⌐ S54

The UE receives a synchronization signal sent by the second cell to achieve synchronization with the second cell ⌐ S55

The UE receives system information related to the second cell sent by the second cell ⌐ S56

The UE sends a second application signal on the resource determined in S56 to apply for obtaining the second cell ⌐ S57

The UE receives a second response signal sent by the second cell ⌐ S58

FIG. 5

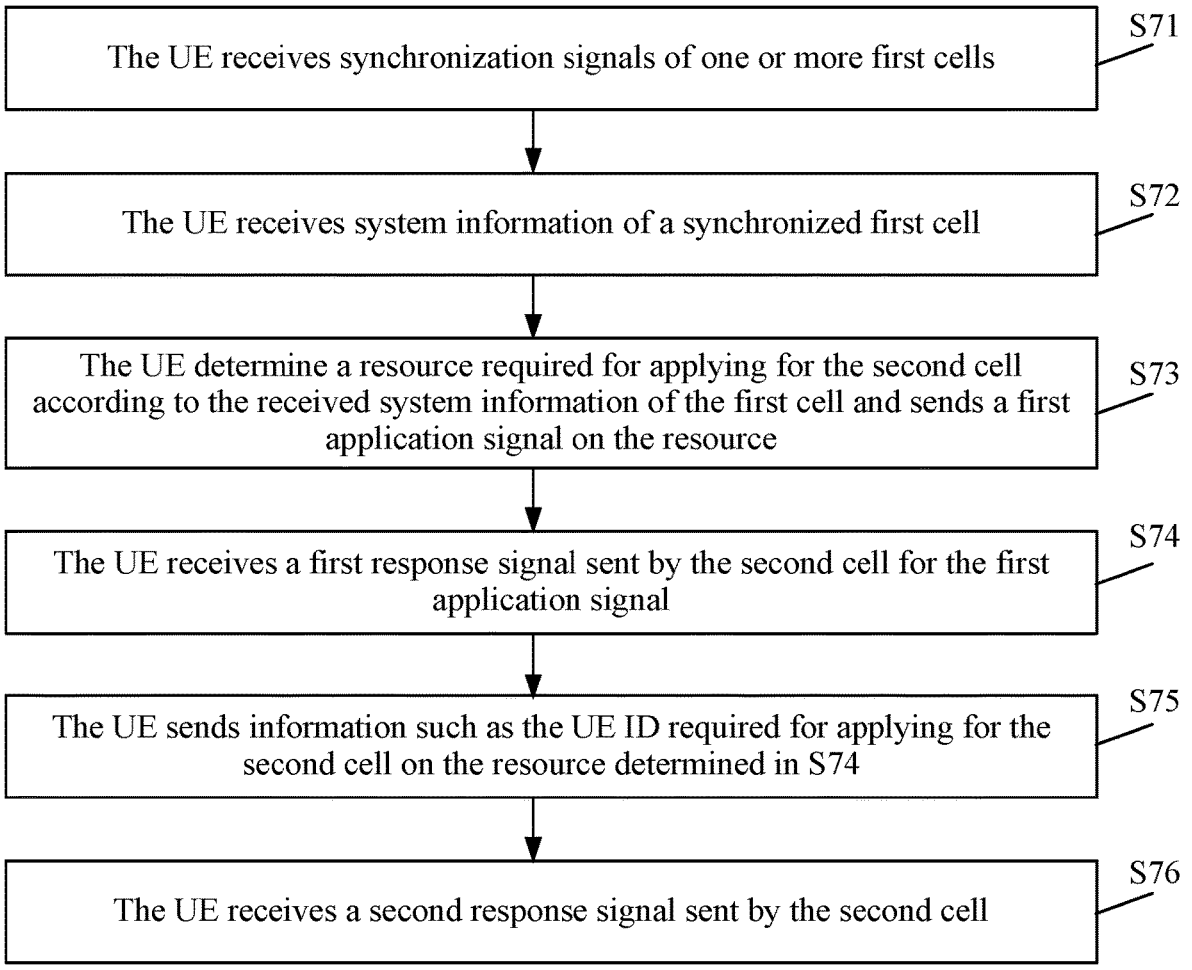

The UE receives synchronization signals of one or more first cells ⎤ S71

The UE receives system information of a synchronized first cell ⎤ S72

The UE determine a resource required for applying for the second cell according to the received system information of the first cell and sends a first application signal on the resource ⎤ S73

The UE receives a first response signal sent by the second cell for the first application signal ⎤ S74

The UE sends information such as the UE ID required for applying for the second cell on the resource determined in S74 ⎤ S75

The UE receives a second response signal sent by the second cell ⎤ S76

FIG. 7

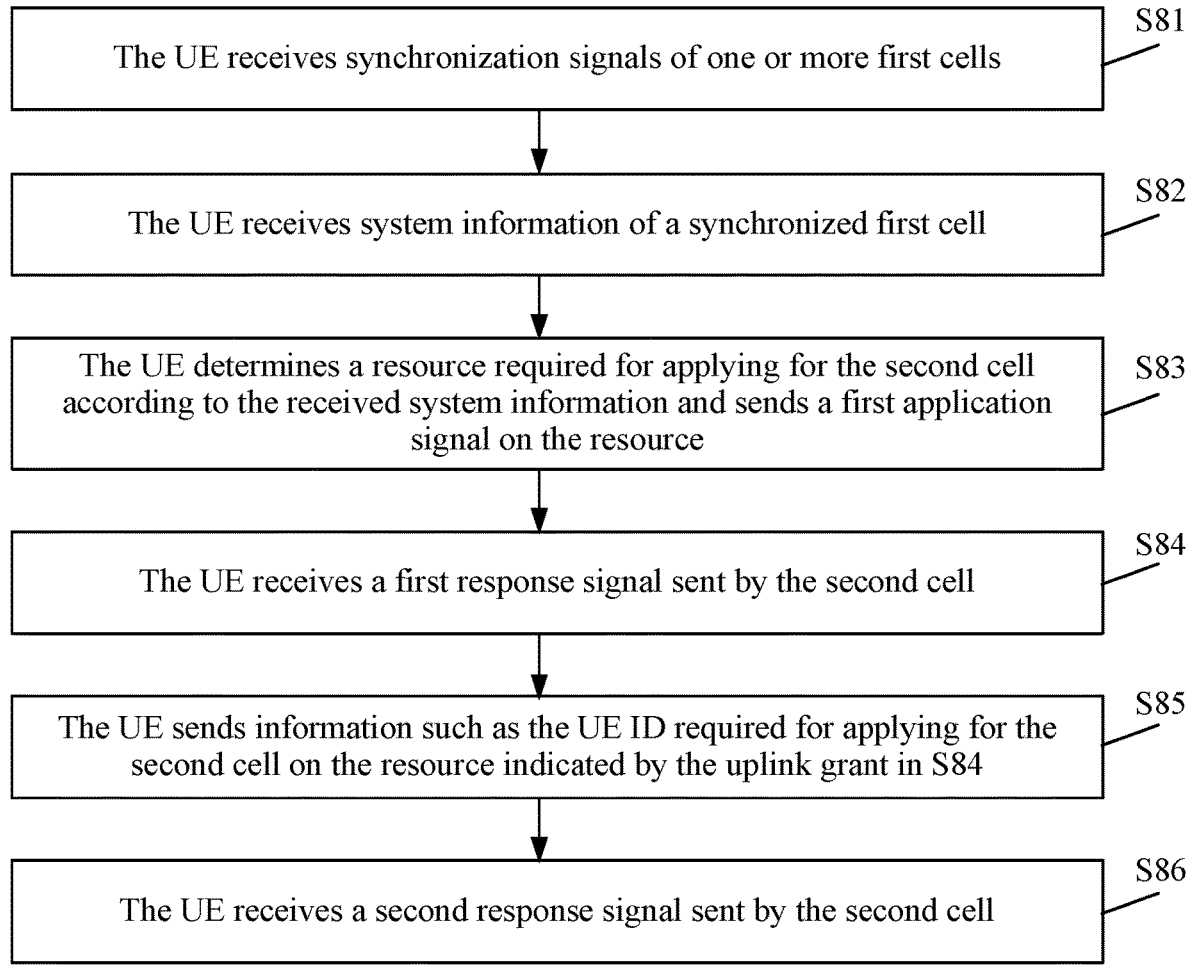

The UE receives synchronization signals of one or more first cells    S81

The UE receives system information of a synchronized first cell    S82

The UE determines a resource required for applying for the second cell according to the received system information and sends a first application signal on the resource    S83

The UE receives a first response signal sent by the second cell    S84

The UE sends information such as the UE ID required for applying for the second cell on the resource indicated by the uplink grant in S84    S85

The UE receives a second response signal sent by the second cell    S86

CELL ACCESS METHOD AND APPARATUS, DEVICE, AND STORAGE MEDIUM

CROSS REFERENCE TO RELATED APPLICATIONS

This is a National Stage Application filed under 35 U.S.C. 371 based on International Patent Application No. PCT/CN2021/096223, filed on May 27, 2021, which claims priority to Chinese Patent Application No. 202010507125.9 filed on Jun. 5, 2020, disclosures of both of which are incorporated herein by reference in their entireties.

TECHNICAL FIELD

The present application relates to the field of wireless communication, for example, a cell access method and apparatus, a device, and a storage medium.

BACKGROUND

In a cell-free system, each user equipment (UE) has a cell that is centered on the UE itself, and the cell moves with the movement of the UE, so as to minimize the impact of inter-cell interference and frequent handover on the UE. In cell-free technology, the UE needs to establish a radio resource control (RRC) connection with one cell in a cellular system according to the cellular form and then is handed over from the cellular system to the cell-free system.

The above-mentioned method causes the problem that when the UE accesses the cell-free system, the UE still faces serious inter-cell interference and needs to perform frequent cell selection or cell reselection.

SUMMARY

The present application provides a cell access method and apparatus, a device, and a storage medium, so as to reduce the impact of the cellular system on the cell.

Embodiments of the present application provide a cell access method. The method is applied to a first node and includes the following operations.

A first synchronization signal and first system information sent by a second node in a first cell are received, where the first synchronization signal is used for downlink synchronization between the first node and the first cell, the first system information carries first resource indication information, and the first resource indication information at least includes an indication for a resource required for sending a first application signal; the first application signal is sent, where the first application signal is used for requesting the second node to send first information; and the first information is received, where the first information is used for instructing the first node to access a second cell based on the first information.

The embodiments of the present application further provide a cell access method. The method is applied to a second node and includes the following:

A first synchronization signal and first system information are periodically sent in a first cell, where the first synchronization signal is used for downlink synchronization between a first node and the first cell, the first system information carries first resource indication information, and the first resource indication information is used for indicating a resource required for sending a first application signal; the first application signal is received, where the first application signal is used for requesting the second node to send first information; and the first information is sent, where the first information is used for instructing the first node to access a second cell based on the first information.

The embodiments of the present application further provide a cell access apparatus. The apparatus is applied to a first node and includes a first receiving module, a first sending module, and a second receiving module.

The first receiving module is configured to receive a first synchronization signal and first system information sent by a second node in a first cell, where the first synchronization signal is used for downlink synchronization between the first node and the first cell, the first system information carries first resource indication information, and the first resource indication information is used for indicating a resource required for sending a first application signal. The first sending module is configured to send the first application signal, where the first application signal is used for requesting the second node to send first information. The second receiving module is configured to receive the first information, where the first information is used for instructing the first node to access a second cell based on the first information.

The embodiments of the present application further provide a cell access apparatus. The apparatus is applied to a second node and includes a second sending module, a third receiving module, and a third sending module.

The second sending module is configured to periodically send a first synchronization signal and first system information in a first cell, where the first synchronization signal is used for downlink synchronization between a first node and the first cell, the first system information carries first resource indication information, and the first resource indication information is used for indicating a resource required for sending a first application signal. The third receiving module is configured to receive the first application signal, where the first application signal is used for requesting the second node to send first information. The third sending module is configured to send the first information, where the first information is used for instructing the first node to access a second cell based on the first information.

The embodiments of the present application further provide a device. The device includes one or more processors and a memory.

The memory is configured to store one or more programs, where the one or more programs, when executed by the one or more processors, enable the one or more processors to perform the cell access method provided by the embodiments of the present application.

The embodiments of the present application further provide a storage medium. The storage medium is configured to store a computer program, where the computer program, when executed by a processor, performs the cell access method provided by the embodiments of the present application.

BRIEF DESCRIPTION OF DRAWINGS

FIG. 1 is a flowchart of a cell access method according to an embodiment of the present application;

FIG. 2 is a flowchart of a cell access method according to an embodiment of the present application;

FIG. 5 is a flowchart of another method for applying for accessing a cell through dual application signals according to an embodiment of the present application;

FIG. 7 is a flowchart of a method for applying for accessing a cell through a single application signal according to an embodiment of the present application;

FIG. 8 is a flowchart of another method for applying for accessing a cell through a single application signal according to an embodiment of the present application;

DETAILED DESCRIPTION

Figure 3:
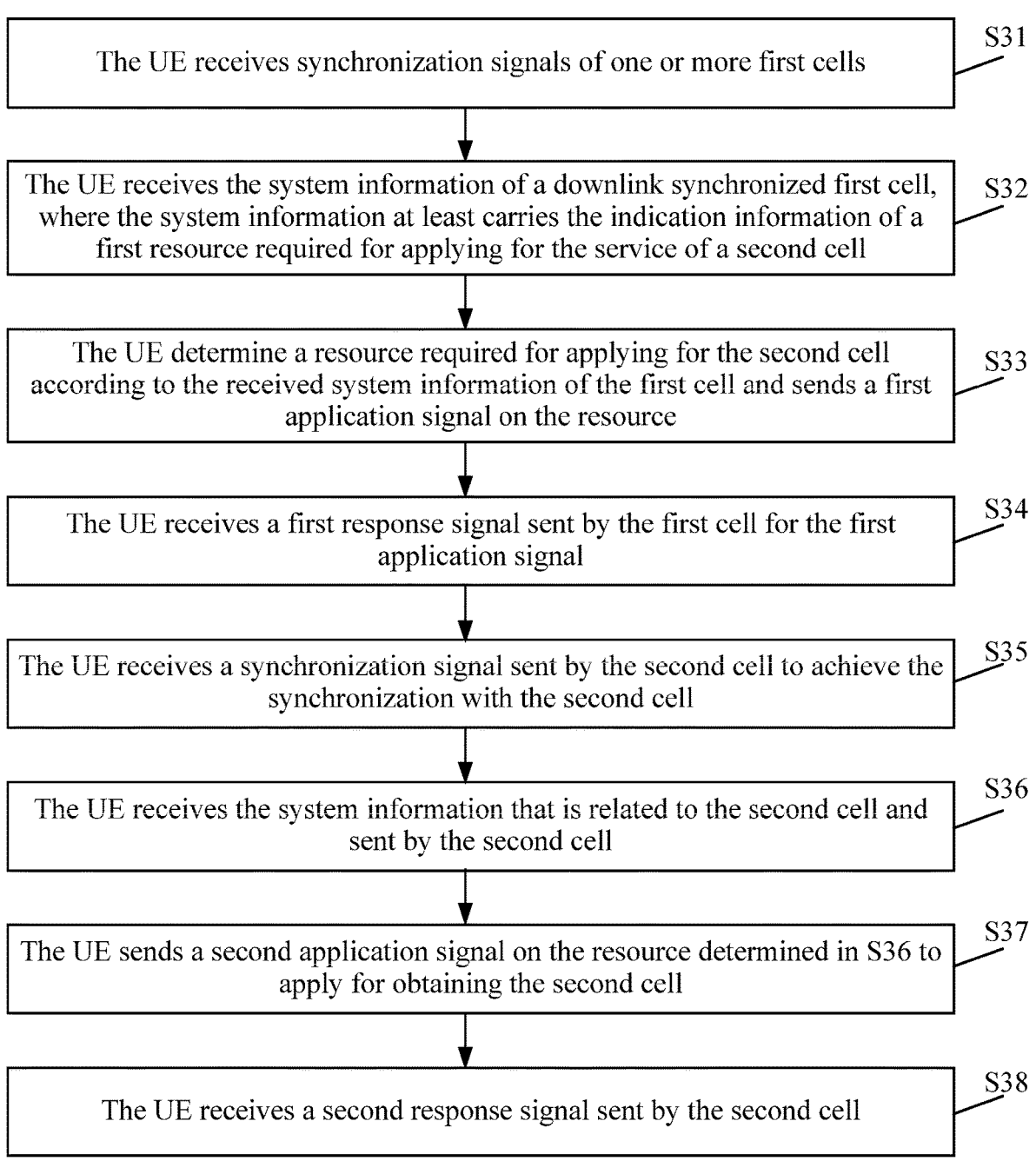
FIG. 3 is a flowchart of a method for applying for accessing a cell through dual application signals according to an embodiment of the present application.

Embodiments of the present application are described hereinafter in conjunction with drawings.

The methods illustrated in the flowcharts among the drawings may be performed by, for example, a computer system capable of executing a set of computer-executable instructions. Moreover, although logical sequences are illustrated in the flowcharts, in some cases, the illustrated or described steps may be performed in sequences different from the sequences described herein.

Through frequency reuse and cell splitting technology, the cellular network architecture can improve the utilization rate of spectrum resources and system capacity and support the rapid development of mobile communication. In order to satisfy the continuously increasing traffic demand, the whole evolution of mobile communication from the first-generation mobile communication technology (1G) to the fifth-generation mobile communication technology (5G) is based on the cellular network, that is, the evolution proceeds using the manner of macrocellular cell splitting and vertical microcellular network layering.

The cell splitting is the most effective way to improve the capacity of radio systems. However, with the deployment of various low power nodes (LPN) including various microcells, small cells, home base stations and relay nodes in conventional cellular networks, cellular networks are becoming more and more heterogeneous and dense, which leads to a series of problems that reduce the system capacity and worsens user experience, such as serious inter-cell interference and frequent handover of UEs during mobility.

To solve the above problems, a cell-free system is proposed. In such a system, a large number of access points (APs) installed with one or more antennas are distributed in a large area, data is transmitted to a central processing unit (CPU) through a forward link, and multiple users are served using the same time-frequency resources. The AP usually has only a few baseband functions such as precoding, channel estimation and radio frequency functions, and the CPU is responsible for scheduling, power control and pilot allocation functions. In such a system, each UE has a cell that is centered on the UE itself, and the cell moves with the movement of the UE, so as to minimize the impact of inter-cell interference and frequent handover on the UE. Therefore, the cell-free technology is the key technology to satisfy the demand for future 6G.

However, in cell-free related technologies, it is assumed that the UE can work in a cell-free mode only after an RRC connection has been established, and before the UE works in a cell-free mode, the UE needs to establish an RRC connection with one cell in a cellular system according to the cellular form and then is handed over from the cellular system to the cell-free system. The disadvantage of this method is that since the cellular system and the cell-free system are based on two different design concepts, among which the former is base station-centered while the latter is UE-centered, in the related art, after the two systems with different design concepts are put together, when the UE accesses the cell-free system, the UE still faces problems such as serious inter-cell interference and frequent cell selection/cell reselection, and this mechanism may even become the bottleneck of the overall performance of the cell-free system. Therefore, the present application proposes a new method of accessing the cell-free system.

In an embodiment, a cell access method is provided. The method is applied to a first node, and as shown in FIG. 1, the cell access method provided by this embodiment of the present application mainly includes S11, S12 and S13.

In S11, a first synchronization signal and first system information sent by a second node in a first cell are received, where the first synchronization signal is used for downlink synchronization between the first node and the first cell, the first system information carries first resource indication information, and the first resource indication information at least includes an indication for a resource required for sending a first application signal.

In S12, the first application signal is sent, where the first application signal is used for requesting the second node to send first information.

In S13, the first information is received, where the first information is used for instructing the first node to access a second cell based on the first information.

In this embodiment, the first cell is a common cell, a network system may include one or more common cells, and the second cell may be understood as a UE-specific cell. The first cell may be implemented by conventionally deployed cellular base stations or by densely deployed distributed APs (also including a CPU responsible for managing these APs). The specific cell is usually implemented by densely deployed distributed APs, and these APs may be controlled by conventional cellular base stations. These APs may also be managed by a dedicated CPU, and in a case where the APs are managed by the CPU, there is an interface between the CPU and the cellular base station for communication.

In an example embodiment, the first application signal is sent in the first cell, or the first application signal is sent in the second cell.

In an example embodiment, in a case where the first application signal is sent in the first cell, the first application signal carries measurement result information of a first cell synchronization signal or location information of a UE.

In an example embodiment, in a case where the first application signal is sent in the second cell, the first application signal carries a sequence pre-configured by a network.

In an example embodiment, the operation where the first information is received includes: a first response signal is received, where the first response signal is a response signal of the first application signal.

In an example embodiment, the operation where the first node accesses the second cell based on the first information includes the following operations.

A second synchronization signal is received, where the second synchronization signal is used for downlink synchronization between the first node and the second cell; second system information is received, where the second system information carries second resource indication information, and the second resource indication information is used for indicating a resource required for sending a second application signal; the second application signal is sent, where the second application signal is used for uplink synchronization between the first node and the second cell; and a second response signal is received, where the second response signal carries information allowing the access of the first node.

In an example embodiment, the operation where the second synchronization signal is received includes the following operation.

The second synchronization signal is received at a frequency domain location of the second synchronization signal; where the frequency domain location of the second synchronization signal is determined by frequency domain location information carried in the first information, or the frequency domain location of the second synchronization signal is determined by a frequency domain location of the first synchronization signal and a preset relationship.

In an example embodiment, the operation where the first node accesses the second cell based on the first information includes the following operations.

A first physical downlink control channel (PDCCH) of a first response signal is received; the first response signal is received based on the first PDCCH, where the first response signal carries a cell identifier of the first cell and uplink grant information; a third application signal is sent on a resource determined by the uplink grant information, where the third application signal carries information required for applying for the second cell; a second PDCCH of the third response signal is received, where the third response signal is a response signal of the third application signal; and the third response signal is received based on the second PDCCH, where the third response signal carries information allowing the access of the first node.

In an example embodiment, the operation where the first PDCCH of the first response signal is received includes the following operation.

The first PDCCH of the first response signal is received in the first cell.

In an example embodiment, the operation where the first response signal is received includes the following operation.

The first response signal is received in the first cell, or first response signal is received in the second cell.

In an example embodiment, the first PDCCH is scrambled by using a first radio network temporary identity (RNTI).

In an example embodiment, the third application signal and the second PDCCH are scrambled by using a second RNTI, where the first RNTI and the second RNTI are same or the first RNTI and the second RNTI are different.

In an example embodiment, the first response signal carries the first RNTI and the second RNTI that are different from each other.

In an example embodiment, the first response signal carries the first RNTI; the second RNTI is determined by the first RNTI and the cell identifier of the first cell or the first response signal carries the second RNTI; and the first RNTI is determined by the second RNTI and the cell identifier of the first cell.

In an embodiment, a cell access method is provided. The method is applied to a second node, and as shown in FIG. 2, the cell access method provided by this embodiment of the present application mainly includes S21, S22 and S23.

In S21, a first synchronization signal and first system information are periodically sent in a first cell, where the first synchronization signal is used for downlink synchronization between a first node and the first cell, the first system information carries first resource indication information, and the first resource indication information is used for indicating a resource required for sending a first application signal.

In S22, the first application signal is received, where the first application signal is used for requesting the second node to send first information.

In S23, the first information is sent, where the first information is used for instructing the first node to access a second cell based on the first information.

In an example embodiment, in a case where the first information is a first response signal, the method further includes: a second synchronization signal is sent, where the second synchronization signal is used for downlink synchronization between the first node and the second cell; second system information is sent, where the second system information carries second resource indication information, and the second resource indication information is used for indicating a resource required for sending a second application signal; the second application signal is received, where the second application signal is used for uplink synchronization between the first node and the second cell; and a second response signal is sent, where the second response signal carries information allowing the access of the first node.

In an example embodiment, in a case where the first information is a first PDCCH of a first response signal, the method further includes: the first PDCCH of the first response signal is sent; and the method further includes: the first response signal is sent, where the first response signal carries a cell identifier of the first cell and uplink grant information; a third application signal is received, where the third application signal carries information required for applying for the second cell; a second PDCCH of the third response signal is sent, where the third response signal is a response signal of the third application signal; and the third response signal is sent, where the third response signal carries information allowing the access of the first node.

In an embodiment, a method for applying for accessing a cell through dual application signals is provided.

As shown in FIG. 3, one the UE side, a UE obtains the second cell through the following operations.

In S31, the UE receives synchronization signals of one or more first cells. The UE may achieve the downlink synchronization with at least one first cell using the synchronization signals.

In S32, the UE receives the system information of a downlink synchronized first cell, where the system information at least carries the indication information of a first resource required for applying for the service of a second cell.

In S33, the UE determines a resource required for applying for the second cell according to the received system information of the first cell and sends a first application signal on the resource.

The first application signal carries measurement result-related information including first cell synchronization signals, such as the indexes of K strongest first cell synchronization signals, where the index of the synchronization signal is represented by the physical cell index (PCI), and the K strongest first cell synchronization signals refer to K synchronization signals with the strongest reference signal receiving power (RSRP) or the strongest reference signal receiving quality (RSRQ).

The measurement result-related information may be carried in an implicit manner. For example, for index sorting/ RSRP/RSRQ of different first cell synchronization signals, the network configures different sequences. The measurement result-related information may also be carried in an explicit manner. For example, for index sorting/RSRP/ RSRQ of different first cell synchronization signals, the network configures different physical uplink shared channels (PUSCHs).

The network receives the first application signal (including the measurement information) sent by the UE and organizes an appropriate AP set according to the measurement information to form the second cell to serve the UE, where the service provided for the UE includes: sending synchronization signals and response information for the target UE.

In S34, the UE receives a first response signal sent by the first cell for the first application signal.

The first response signal at least carries frequency domain location information of a second cell synchronization signal.

The first response signal may also include a sequence adopted by the second cell synchronization signal. The sequence is also UE-specific, and using the frequency domain location information of the second cell synchronization signal, the UE speeds up the synchronization speed and also avoids the case where the UE synchronizes with a second cell that is not intended to serve the UE.

In S35, the UE receives a synchronization signal sent by the second cell to achieve the synchronization with the second cell.

In S36, the UE receives the system information that is related to the second cell and sent by the second cell.

The system information at least includes indication information of a second resource for accessing the second cell.

In S37, the UE sends a second application signal on the resource determined in S36 to apply for obtaining the second cell.

In S38, the UE receives a second response signal sent by the second cell.

If the second response signal indicates that the application of the UE has been accepted, meaning that the wireless connection between the UE and the second cell has been established, the UE may perform bidirectional communication with the network using the second cell.

Accordingly, on the network side, in order to cooperate with the UE to apply for the second cell, the main work of the network includes the following.

1. A synchronization signal of the first cell is periodically sent in the first cell.
The UE may achieve the downlink synchronization with at least one first cell using the synchronization signal.
2. The system information of the first cell is periodically sent in the first cell.
The system information at least carries the indication information of a first resource required for applying for the service of the second cell, and the resource required for applying for the service of the second cell is in the bandwidth of the first cell.
3. The first application signal for applying for the second cell is received at a preset time-frequency location.
4. A first response signal for the first application signal is sent in the first cell.
The first response signal at least carries frequency domain location information including the second cell synchronization signal.
The first response signal may also include one or more of the time offset between the second cell synchronization signal and the first cell synchronization signal, the bandwidth of the second cell, and control resource set configuration information (resource set for sending the PDCCH).
5. A synchronization signal is sent in the second cell, where the synchronization signal is used for the downlink synchronization between the target UE and the second cell.
6. A system information related to the second cell is sent in the second cell, where the system information at least includes indication information of a second resource for accessing the second cell.
7. A second application signal sent by the UE is received in the second cell.
8. A second response signal of the second application signal is sent in the second cell.

If the second response signal indicates that the application of the UE has been accepted, meaning that the wireless connection between the UE and the second cell has been established, the UE may perform bidirectional communication with the network using the second cell.

For the synchronization of single transmission, the resource occupied by the synchronization signal sent by the second cell is smaller than the resource occupied by the synchronization signal sent by the first cell, or the length of the sequence of the synchronization signal sent by the second cell is shorter than the length of the sequence of the synchronization signal sent by the first cell.

In the present application, in addition to the downlink synchronization, the first cell is also used for distinguishing different first cells. In order to minimize the interference of adjacent cells, the synchronization signal of the first cell usually needs to use a relatively long sequence, meaning that the synchronization signal of the first cell needs to occupy more resources. The second cell is a UE-specific cell, the synchronization signal of the second cell is also UE-specific, and the main purpose of the second cell is downlink synchronization and usually needs fewer resources to achieve this purpose.

The first application signal sent by the UE in S33 and the second application signal sent by the UE in S37 are not exactly the same.

The similarity of the above two application signals is that they can achieve uplink synchronization and UE identification, and the difference is that the first application signal sent in S33 carries measurement result-related information of the first cell synchronization signal, such as K (K>=2) synchronization signal indexes of first cell synchronization signals with the strongest reference signal received power (RSRP) or the strongest reference signal receiving quality (RSRQ), the values of RSRP/RSRQ corresponding to the K synchronization signal indexes, and the like.

In the present application, the first cell may be implemented by a conventional base station or an AP that achieves dense deployment, and the base station or AP receives the first application signal (including the measurement information) sent by the UE and may request the CPU to organize an appropriate AP set according to the measurement information to form a second cell to serve the UE (including sending synchronization signals and response information for the target UE). Such a mechanism is more suitable for the case where the uplink and downlink frequency points are different and the channel reciprocity is not accurate enough. In S37, there is no such requirement as long as the second application signal achieves uplink synchronization and UE identification.

S37 and S38 may be split into four operations below.

The UE sends an application signal for uplink synchronization on the resource determined in S36 to apply for obtaining the second cell. The application signal is also used for uplink synchronization.

The UE receives a response signal sent by the second cell, where the response information includes at least one piece of uplink grant information and information for the UE to send a UE identifier (ID).

The UE sends information such as the UE ID required for applying for a second cell on the resource determined in the previous operation.

A second response signal sent by the second cell is received.

If the response signal indicates that the application of the UE has been accepted, meaning that the wireless connection between the UE and the second cell has been established, the UE may perform bidirectional communication with the network using the second cell.

It is assumed that the frequency domain location of the first application signal sent in S33 has a preset one-to-one correspondence or one-to-many relationship with the frequency domain location of the synchronization signal sent by the second cell. For example, the frequency domain location of the first application signal is X, and the frequency domain location of the synchronization signal sent by the second cell is X+offset, where the offset is a fixed value or one of a plurality of fixed values. In this case, the sending or receiving of the response signal in S34 may be omitted and S35 may be directly executed.

Figure 4:
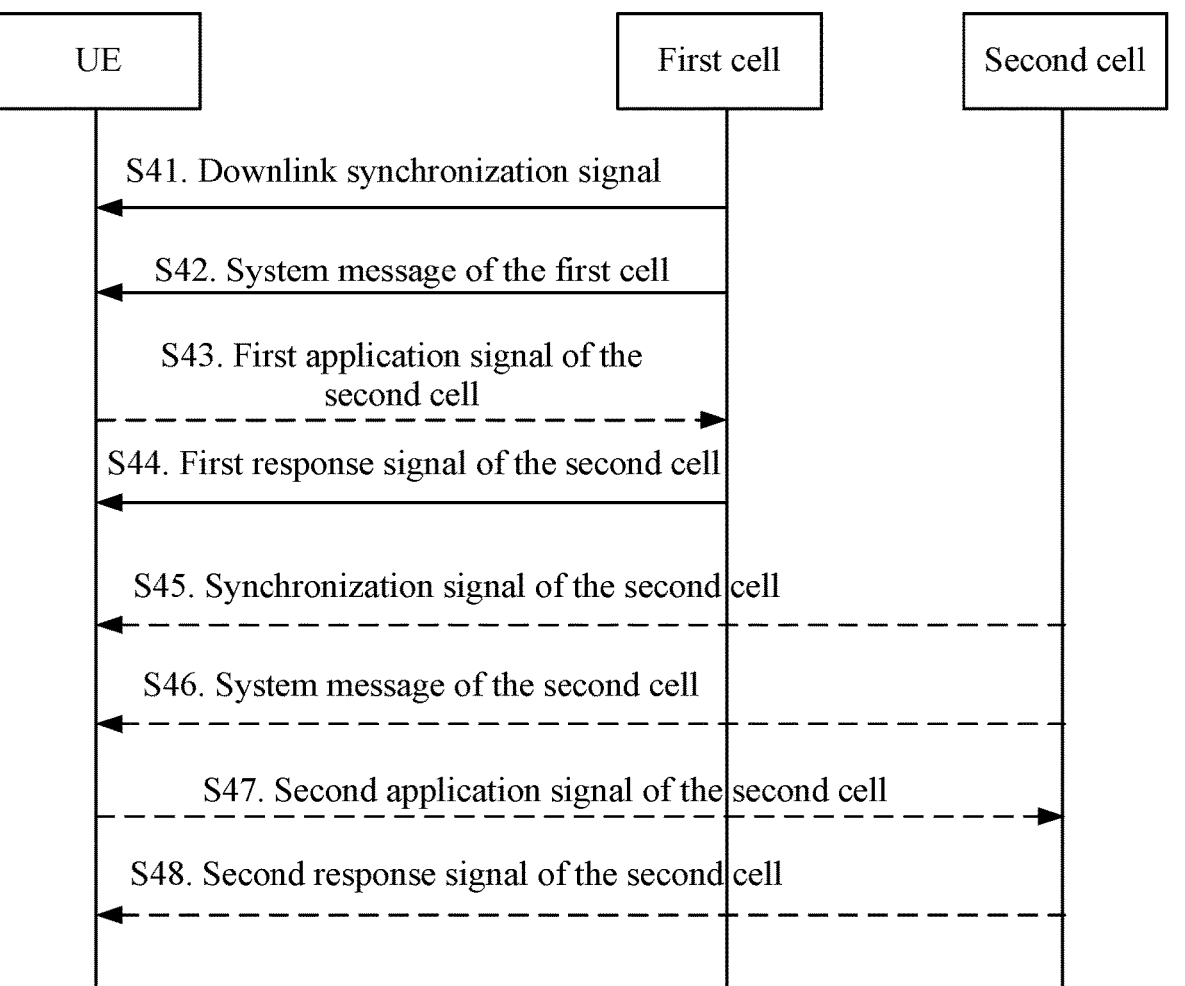
FIG. 4 is a flowchart of an interaction method for applying for accessing a cell through dual application signals according to an embodiment of the present application.

In an embodiment, a method for applying for accessing a cell through dual application signals is provided. As shown in FIG. 4, the method includes the following operations.

In S41, a first cell sends a downlink synchronization signal to a UE.

In S42, the first cell sends a system message of the first cell to the UE, where the system information at least carries the indication information of a first resource required for applying for the service of the second cell.

In S43, the UE sends a first application signal of the second cell to the first cell.

In S44, the first cell sends a first response signal for the first application signal to the UE.

In S45, the UE receives a synchronization signal of the second cell sent by the second cell.

In S46, the UE receives a system message of the second cell sent by the second cell.

In S47, the second cell receives a second application signal sent by the UE.

In S48, the second cell sends a second response signal of the second application signal to the UE.

In an embodiment, a method for applying for accessing a cell through dual application signals is provided.

As shown in FIG. 5, on the UE side, a UE obtains the second cell through S51 to S58.

In S51, the UE receives synchronization signals of one or more first cells.

The UE may achieve the downlink synchronization with at least one first cell by using the synchronization signals.

In S52, the UE receives system information of a synchronized first cell.

The system information at least carries the indication information (including the frequency point, bandwidth and other information of a first resource) of the first resource required for applying for the service of the second cell and the conditions required to be satisfied for using the first resource. The resource required for applying for the second cell is in the bandwidth of the second cell.

In S53, the UE determines a resource required for applying for the second cell according to the received system information and sends a first application signal on the resource. The first application signal consists of a sequence pre-configured by the network.

In S54, the UE receives a first response signal sent by the second cell for the first application signal, where the first response signal at least carries frequency domain location information of a second cell synchronization signal.

The first response signal may also include a sequence adopted by the second cell synchronization signal. The sequence is also UE-specific, and using the information, the UE speeds up the synchronization speed and also avoids the case where the UE synchronizes with a second cell that is not intended to serve the UE. In addition, since the application signal sent by the UE is sent to the second cell, if the response is sent by the first cell, the network needs to know the first cell that assigns the application signal, and if the network does not know the first cell that assigns the application signal, it is assumed that the frequency domain location of the application signal has a preset one-to-one correspondence or one-to-many relationship with the frequency domain location of the synchronization signal sent by the second cell. For example, assuming that the frequency domain location of the first application signal is X, the frequency domain location of the synchronization signal sent by the second cell is X+offset, where offset is a fixed value or one of a plurality of fixed values.

The value or the value set of offset may also be indicated in the system information of the first cell, and in this case, S54 may be omitted.

In S55, the UE receives a synchronization signal sent by the second cell to achieve synchronization with the second cell.

The length of the sequence of the synchronization signal sent by the second cell or the resource occupied by the synchronization signal sent by the second cell is smaller than the length of the sequence of the synchronization signal sent by the first cell. For the timing of the synchronization signal sent by the second cell, there are two possible mechanisms: one mechanism is that the AP constituting the second cell sends a synchronization signal according to the timing of receiving the application signal, and accordingly, both parties may also agree on the timing between the sending of the application signal and the sending of the synchronization signal; the other possible mechanism is that the AP constituting the second cell sends a synchronization signal according to its own clock. In the former mechanism, the UE detects the synchronization signal more quickly, but the cell-free system may need to serve multiple UEs simultaneously, and different timing of multiple UEs may cause large interference. The latter mechanism avoids the defects of the former mechanism, but the defect of the latter mechanism is that the UE needs to perform sliding search on the synchronization signal in terms of time as in the cellular system.

In S56, the UE receives system information related to the second cell sent by the second cell, where the system information at least includes indication information of a second resource for accessing the second cell.

In S57, the UE sends a second application signal on the resource determined in S56 to apply for obtaining the second cell.

In S58, the UE receives a second response signal sent by the second cell.

If the second response signal indicates that the application of the UE has been accepted, meaning that the wireless connection between the UE and the second cell has been established, the UE may perform bidirectional communication with the network using the second cell.

The first application signal sent by the UE in S53 is different from the second application signal sent by the UE in S57.

The function of the first application signal is to let the network know the existence and application of the UE so that the network sends a synchronization signal for downlink synchronization with the second cell to the UE according to the received application signal. When the UE sends the application signal, the UE has not achieved the downlink synchronization with the second cell.

In addition, different from the embodiments described above, since the first application signal is sent in the second cell, the receiving station (such as an AP near the UE) of the second cell may directly detect the signal sent by the UE, and the pre-coding used for sending a second cell downlink signal is determined through channel reciprocity. In this manner, the first application signal sent in this embodiment does not need to carry the measurement result of the first cell synchronization signal and may be achieved by a sequence pre-configured by the network.

Considering the function of the first application signal, the network also configures some parameters related to the first application signal, such as a cyclic prefix length, a guard gap length, and the like. When the second application signal is sent, the UE has achieved downlink synchronization with the second cell, and the second application signal is used for uplink synchronization between the second cell and the UE.

Accordingly, on the network side, in order to cooperate with the UE to apply for the second cell, the main work of the network includes the following.

1. The synchronization signal of the first cell is periodically sent in the first cell.

The UE may achieve the downlink synchronization with at least one first cell using the synchronization signal.

2. The system information of the first cell is periodically sent in the first cell.

The system information at least carries the indication information (including the frequency point, bandwidth and other information of a first resource) of the first resource required for applying for the second cell and the conditions required to be satisfied for using the first resource. The resource required for applying for the second cell is in the bandwidth of the second cell.

3. The first application signal for applying for the second cell is received at a preset time-frequency location.

4. The first response signal of the first application signal is sent in the first cell.

5. A synchronization signal is sent in the second cell, where the synchronization signal is used for downlink synchronization between the target UE and the second cell.

6. The system information related to the second cell is sent in the second cell, where the system information at least includes indication information of a second resource required for accessing the second cell.

7. The second application signal for applying for the second cell is received at the preset time-frequency location.

The first application signal sent by the UE in 3 is different from the application signal sent herein.

8. A second response signal of the second application signal is sent in the second cell. If the second response signal indicates that the application of the UE has been accepted, meaning that the wireless connection between the UE and the second cell has been established, the UE may perform bidirectional communication with the network using the second cell.

In the embodiments described above, the second cell sends the synchronization signal and other response signals only after the second cell receives the application from the UE. In this manner, the disadvantage that the synchronization signal/system information is still periodically sent even though no UE is involved in the conventional cellular system is avoided, that is, power is saved and interference is reduced.

According to the received application signal sent by the UE or the measurement result carried by the application signal, the network may generate a UE-specific cell that is centered on the UE, thereby greatly improving the performance of the system to which the UE accesses. Finally, in the embodiment described above, the UE obtains the application resource for applying for the second cell according to the first cell, but the synchronization of the two types of cells is not required, thereby reducing the requirements for scheme application.

Figure 6:
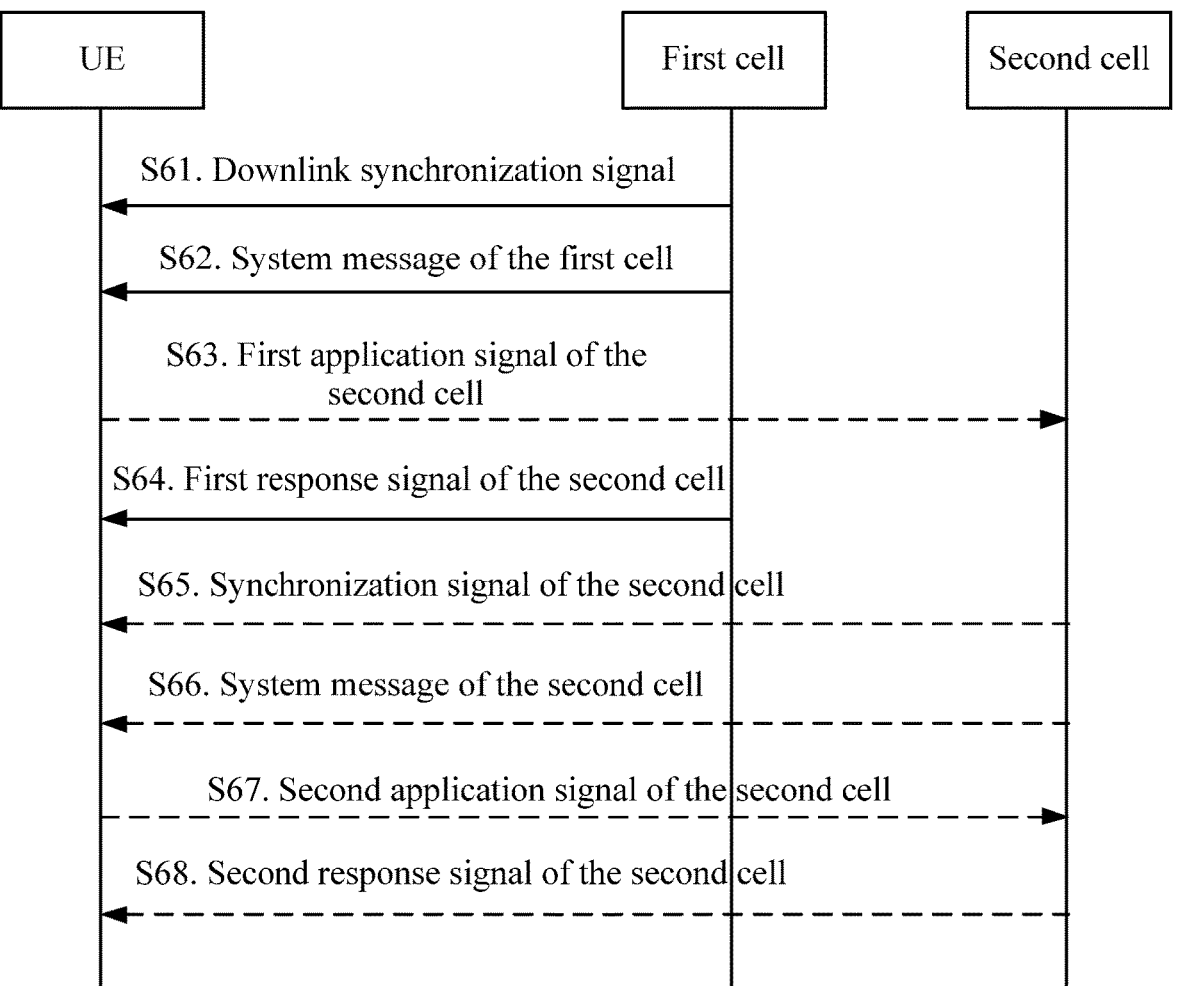
FIG. 6 is a flowchart of another interaction method for applying for accessing a cell through dual application signals according to an embodiment of the present application.

In an embodiment, a method for applying for accessing a cell through dual application signals is provided. As shown in FIG. 6, the method includes the following operations.

In S61, a first cell sends a downlink synchronization signal to a UE.

In S62, the first cell sends system message of the first cell to the UE, where the system information at least carries the indication information of a first resource required for applying for the service of the second cell.

In S63, the UE sends a first application signal of the second cell to the second cell.

In S64, the first cell sends a first response signal to the UE for the first application signal.

In S65, the UE receives a synchronization signal of the second cell sent by the second cell.

In S66, the UE receives a system message of the second cell sent by the second cell.

In S67, the second cell receives a second application signal sent by the UE.

In S68, the second cell sends a second response signal of the second application signal to the UE.

In an embodiment, a method for applying for accessing a cell through a single application signal is provided.

As shown in FIG. 7, on the UE side, a UE obtains the second cell through the following operations.

In S71, the UE receives synchronization signals of one or more first cells.

The UE may achieve the downlink synchronization with at least one first cell by using the synchronization signals.

In S72, the UE receives system information of a synchronized first cell.

The system information at least carries the indication information of a resource required for applying for the service of the second cell, frequency point information and bandwidth information of the second cell, and control resource set configuration information (resource set for sending the PDCCH). The resource required for applying for the second cell is in the bandwidth of the second cell.

In S73, the UE determines a resource required for applying for the second cell according to the received system information of the first cell and sends a first application signal on the resource.

The first application signal consists of a sequence preconfigured by the network. At the receiving end, the first application signal may be used for uplink synchronization between the second cell and the UE, and may also be used for determining the AP set serving the UE.

In S74, the UE receives a first response signal sent by the first cell for the first application signal.

If the application of the UE is accepted, the first response signal at least includes a cell identifier of the first cell for indicating the first application signal, uplink grant information, and the like.

In S75, the UE sends information such as the UE ID required for applying for the second cell on the resource determined in S74.

In S76, a second response signal sent by the second cell is received. If the response signal indicates that the application of the UE has been accepted, meaning that the wireless connection between the UE and the second cell has been established, the UE may perform bidirectional communication with the network using the second cell.

Accordingly, on the network side, in order to cooperate with the UE to apply for the second cell, the main work of the network includes the following.

1. The synchronization signal of the first cell is periodically sent in the first cell.

The UE may achieve the downlink synchronization with at least one first cell using the synchronization signals.

2. The system information of the first cell is periodically sent in the first cell.

The system information at least carries the indication information of a resource required for applying for the second cell, frequency point information and bandwidth information of the second cell, and control resource set configuration information (resource set for sending the PDCCH). The resource required for applying for the second cell is in the bandwidth of the second cell.

3. An application signal that is used for applying for the second cell and sent by the UE is received.

4. A response signal corresponding to the application signal is sent. If the application of the UE is accepted, the response signal at least includes an identifier of the first cell to which the application signal belongs, uplink grant information, and the like.

5. Information that is sent by the UE by using the grant resource is received, where the information at least has information related to the UE ID.

6. The response information received in 5 is sent to the UE. If the application of the UE is accepted, the response information at least includes the UE ID information received in 5.

Compared with the embodiments described above, the UE accesses the second cell through fewer operations and does not need to apply to the second cell for sending the downlink synchronization signal, meaning that the UE can access the second cell faster.

This embodiment is performed on the condition that the UE may receive the signal of the second cell using the downlink timing of the first cell. Then, after the UE accesses the second cell, the network may send the UE ID as required.

Compared with the conventional four-step access method for the cellular system, the main difference between this embodiment and the conventional access method is as follows:

The response signal sent by the network to the UE carries one first cell identifier. With such a design, in one aspect, the application resources of the second cell are shared in a plurality of first cells, thereby enabling one second cell to serve the UEs in a plurality of first cells; in another aspect, the carrying of the first cell identifier can also achieve conflict resolution earlier, while in the conventional four-step access method for the cellular system, conflict resolution is achieved in the last step.

In this embodiment, the UE initiates an access application to the second cell through the system information of the first cell, while in the conventional four-step access method for the cellular system, the cell accessed by the UE and the cell corresponding to the system information are the same cell. In this embodiment, the first cell is a conventional cellular cell, and the second cell is a cell-free cell where APs are densely deployed, providing a better user experience after the UE accesses the second cell.

In an embodiment, a method for applying for accessing a cell through a single application signal is provided. In this embodiment, a first application signal is sent in a first cell, and downlink control information (DCI) for scheduling a second cell to send a response signal needs to be scrambled with a specific random access (RA)-RNTI.

As shown in FIG. 8, on the UE side, a UE obtains the second cell through the following operations.

In S81, the UE receives synchronization signals of one or more first cells.

The UE may achieve the downlink synchronization with at least one first cell by using the synchronization signals.

In S82, the UE receives system information of a synchronized first cell.

The system information at least carries the indication information of a resource required for applying for the second cell, frequency point information and bandwidth information of the second cell, and control resource set configuration information (resource set for sending the PDCCH). The resource required for applying for the second cell is in the bandwidth of the first cell.

In S83, the UE determines a resource required for applying for the second cell according to the received system information and sends a first application signal on the resource.

The first application signal carries measurement result-related information including a first cell synchronization signal, such as K (K>=2) first cell synchronization signal indexes of synchronization signals with the strongest reference signal received power (RSRP) or the strongest reference signal receiving quality (RSRQ), the values of RSRP/RSRQ corresponding to the K synchronization signal indexes, and the like. Alternatively, the first application signal carries the location information of the UE.

In S84, the UE receives a first response signal sent by the second cell.

The DCI for scheduling the first response signal is also sent by the second cell and scrambled by one specific RA-RNTI, where the RNTI is associated with the identifier of the first cell where the first application signal is located. For example, the RNTI is determined by the index s of the first symbol among application symbols in one slot (with a range of 0 to S−1), the index t of a slot in one radio frame (with a range of 0 to T−1), the frequency domain index f of the frequency domain where the first application signal is located (with a range of 0 to F−1), the carrier index value c of the carrier where the first application signal is located (with a range of 0 to C−1), and the index value of the cell where the first application signal is located (for example, with a range of 0 to P−1), where S, T, F, C, and P are all positive integers, and the value of the RA-RNTI is as follows:

$$RA\text{-}RNTI=1+s+S*t+S*T*f+S*T*F*c+S*T*F*C*p.$$

In addition, the first response signal also carries uplink grant information.

In S85, the UE sends information such as the UE ID required for applying for the second cell on the resource indicated by the uplink grant in S84.

In S86, response information sent by the second cell is received.

If the application of the UE is finally accepted, the response information at least includes the UE ID information sent in S85. If the UE obtains the information, the application for the second cell has been confirmed by the network. The UE may preform bidirectional communication with the network using the second cell.

Accordingly, on the network side, in order to cooperate with the UE to apply for the second cell, the main work of the network includes the following.

1. The synchronization signal of the first cell is periodically sent in the first cell. The UE may achieve the downlink synchronization with at least one first cell using the synchronization signal.
2. The system information of the first cell is periodically sent in the first cell. The system information at least carries the indication information of a resource required for applying for the second cell, frequency point information and bandwidth information of the second cell, and control resource set configuration information (resource set for sending the PDCCH). The resource required for applying for the second cell is in the bandwidth of the first cell.
3. An application signal that is used for applying for the second cell and sent by the UE is received. The application signal carries measurement result-related information including a first cell synchronization signal, such as K (K>=2) first cell synchronization signal indexes with the strongest received signal.
4. The response signal corresponding to the application signal is sent. The DCI for scheduling the first response signal is scrambled by one specific RA-RNTI, where the RNTI is associated with the identifier of the first cell where the application signal is located. For example, the RNTI is determined by the index s of the first symbol among application symbols in one slot (with a range of 0 to S−1), the index t of a slot in one radio frame (with a range of 0 to T−1), the frequency domain index f of the frequency domain where the application signal is located (with a range of 0 to F−1), the carrier index value c of the carrier where the application signal is located (with a range of 0 to C−1), and the index value of the cell where the application signal is located (for example, with a range of 0 to P−1), and the value of the RA-RNTI is as follows:

$$RA\text{-}RNTI=1+s+S*t+S*T*f+S*T*F*c+S*T*F*C*p.$$

In addition, the response signal also carries uplink grant information.

5. The information that is sent by the UE using the grant resource is sent, where the information at least has information related to the UE ID.
6. The response information received in 5 is sent to the UE. If the application of the UE is accepted, the response information at least includes the UE ID information received in 5.

In an embodiment, a method for applying for accessing a cell through a single application signal is provided. In this embodiment, the first application signal carries a plurality of first cell measurement results, the response signal of the second cell carries a first cell identifier, and the first cell identifier is not considered when the DCI for scheduling the response signal is scrambled.

On the UE side, a UE obtains the second cell through the following operations.

1. The UE receives synchronization signals of one or more first cells. The UE may achieve the downlink synchronization with at least one first cell using the synchronization signals.
2. The UE receives the system information of a synchronized first cell, where the system information at least carries the indication information of a resource required for applying for the service of the second cell.
3. The UE determines a resource required for applying for the second cell according to the received system information and sends an application signal on the resource.

The application signal carries measurement result-related information including a first cell synchronization signal, such as K (K>=2) first cell synchronization signal indexes of synchronization signals with the strongest reference signal received power (RSRP) or the strongest reference signal receiving quality (RSRQ), the values of RSRP/RSRQ corresponding to the K synchronization signal indexes, and the like. Without losing generality, the UE usually chooses to send the application signal on a resource indicated by a first cell with the best RSRP/RSRQ, and considering the binding relationship between the application signal and the first cell, the index of the first cell with the strongest RSRP/RSRQ does not need to be displayed and notified. At the receiving end, the application signal may be used for uplink synchronization between the second cell and the UE, and may also be used for determining the AP set serving the UE. Alternatively, the application signal carries the location information of the UE. At the receiving end, the application signal may be used for uplink synchronization between the second cell and the UE, and may also be used for determining the AP set serving the UE.

4. The UE receives a response signal sent by the second cell, where if the application of the UE is accepted, the response signal at least includes an identifier of the first cell to which the application signal belongs, uplink grant information, and the like. Different from the previous embodiment, the RA-RNTI for scheduling the DCI of the response signal is independent of the first cell identifier.
5. The UE sends information such as the UE ID required for applying for the second cell on the resource determined in the previous operation.
6. Response information sent by the second cell is received. If the response signal indicates that the application of the UE has been accepted, meaning that the wireless connection between the UE and the second cell has been established, the UE may perform bidirectional communication with the network using the second cell.

Accordingly, on the network side, in order to cooperate with the UE to apply for the second cell, the main work of the network includes the following.

1. The synchronization signal of the first cell is periodically sent in the first cell. The UE may achieve the downlink synchronization with at least one first cell using the synchronization signal.
2. The system information of the first cell is periodically sent in the first cell, where the system information at least carries the indication information of a resource required for applying for the service of the second cell.
3. An application signal that is used for applying for the second cell and sent by the UE is received.
4. A response signal corresponding to the application signal is sent. If the application of the UE is accepted, the response signal at least includes an identifier of the first cell to which the application signal belongs, uplink grant information, and the like.
5. The information that is sent by the UE using the grant resource is received, where the information at least has information related to the UE ID.
6. The response information received in 5 is sent to the UE. If the application of the UE is accepted, the response information at least includes the UE ID information received in 5.

In an embodiment, a method for applying for accessing a cell through a single application signal is provided. In this embodiment, the first application signal is sent in the second cell, and the DCI for scheduling the response signal of the second cell is scrambled by using an RA-RNTI associated with the first cell identifier.

On the UE side, the UE obtains the second cell through the following operations.

1. The UE receives synchronization signals of one or more first cells. The UE may achieve the downlink synchronization with at least one first cell by using the synchronization signals.
2. The UE receives system information of a synchronized first cell, where the system information at least carries the indication information of a resource required for applying for the service of the second cell, frequency point information and bandwidth information of the second cell, and control resource set configuration information (resource set for sending the PDCCH). The resource required for applying for the second cell is in the bandwidth of the second cell.
3. The UE determines a resource required for applying for the second cell according to the received system information and sends an application signal on the resource. The application signal consists of a sequence preconfigured by the network. At the receiving end, the application signal may be used for uplink synchronization between the second cell and the UE, and may also be used for determining the AP set serving the UE.
4. The UE receives a response signal sent by the second cell, where the DCI for scheduling the first response signal is scrambled by one specific RA-RNTI, and the RNTI is associated with the identifier of the first cell where the application signal is located. For example, the RNTI is determined by the index s of the first symbol among application symbols in one slot (with a range of 0 to S−1), the index t of a slot in one radio frame (with a range of 0 to T−1), the frequency domain index f of the frequency domain where the application signal is located (with a range of 0 to F−1), the carrier index value c of the carrier where the application signal is located (with a range of 0 to C−1), and the index value of the cell where the application signal is located (for example, with a range of 0 to P−1), where S, T, F, C, and P are all positive integers, and the value of the RA-RNTI is as follows:

$$RA\text{-}RNTI=1+s+S*t+S*T*f+S*T*F*c+S*T*F*C*p.$$

In addition, the response signal also carries uplink grant information.

5. The UE sends information such as the UE ID required for applying for the second cell on the resource determined in the previous operation.
6. Response information sent by the second cell is received. If the response signal indicates that the application of the UE has been accepted, meaning that the wireless connection between the UE and the second cell has been established, the UE may perform bidirectional communication with the network using the second cell.

In an embodiment, a method for applying for accessing a cell through a single application signal is provided. In this embodiment, the first application signal is sent in the second cell, and the response signal sent by the second cell needs to carry the identifier of the first cell to which the application signal belongs.

Figure 9:
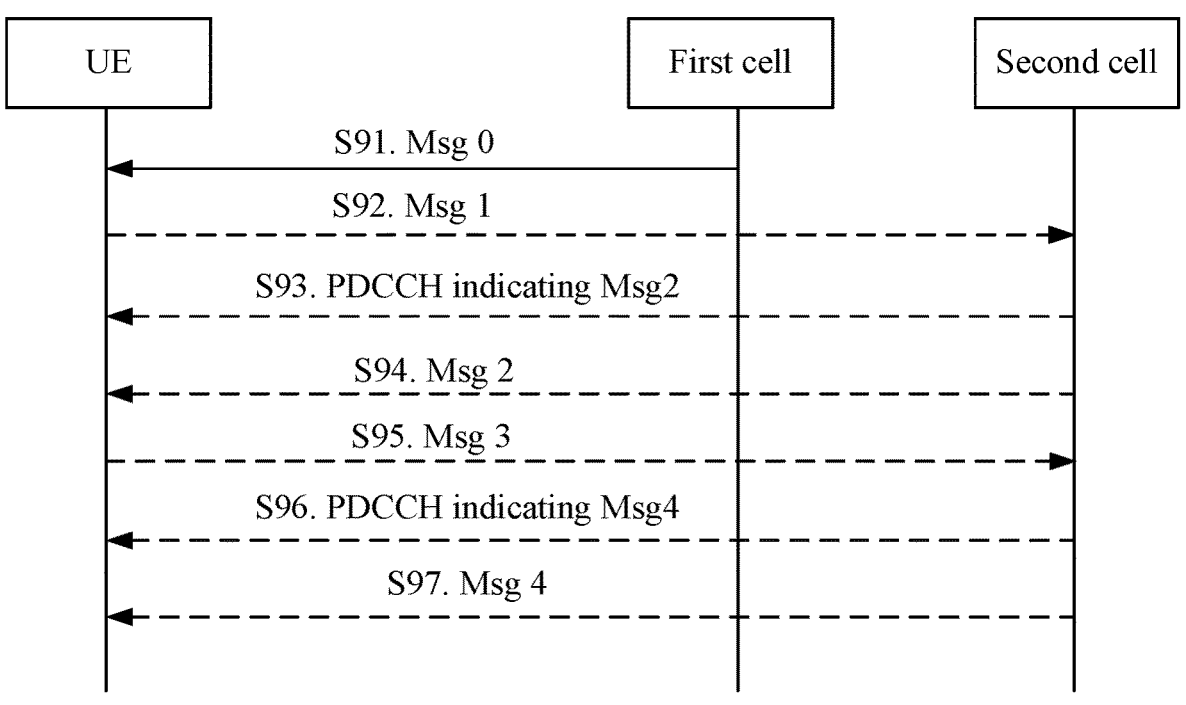
FIG. 9 is a flowchart of another method for applying for accessing a cell through a single application signal according to an embodiment of the present application.

As shown in FIG. 9, on the UE side, a UE obtains the second cell through the following operations.

In S91, the UE receives synchronization signals of one or more first cells.

The UE may achieve the downlink synchronization with at least one first cell using the synchronization signals. The UE receives system information of a synchronized first cell, where the system information at least carries the indication information of a resource required for applying for the service of the second cell, frequency point information and bandwidth information of the second cell, and control resource set configuration information (resource set for sending the PDCCH). The resource required for applying for the second cell is in the bandwidth of the second cell. The synchronization signal and system information received by the UE are represented by Msg0 in FIG. 9, the same below.

In S92, the UE determines a resource required for applying for the second cell according to the received system information and sends an application signal (represented by Msg1 in FIG. 9, the same below) on the resource. The application signal consists of a sequence pre-configured by the network. At the receiving end, the application signal may be used for uplink synchronization between the second cell and the UE, and may also be used for determining the AP set serving the UE.

In S93, the UE receives a PDCCH that indicates a response signal (represented by Msg2 in FIG. 9, the same below) of Msg1 and sent by the second cell.

In S94, the UE receives Msg2 sent by the second cell according to the received PDCCH. The UE receives a response signal sent by the second cell, where if the application of the UE is accepted, the response signal at least includes a cell identifier of the first cell for indicating the application signal, uplink grant information, and the like.

In S95, the UE sends information (represented by Msg3 in FIG. 9, the same below) such as the UE ID required for applying for the second cell on the resource determined in the previous operation.

In S96, the UE receives a PDCCH indicating a response signal (represented by Msg4 in FIG. 9, the same below) of Msg3.

In S97, the UE receives Msg4 according to the received PDCCH. If the response signal indicates that the application of the UE has been accepted, meaning that the wireless connection between the UE and the second cell has been established, the UE may perform bidirectional communication with the network using the second cell.

In this embodiment, the network needs to responds to a plurality of UEs using one or more Msg2, and these UEs may correspond to different first cells (different PCIs). Accordingly, in Msg2, the network needs to notify the UE of the cell to which the UE that is responded using Msg2 belongs, that is, Msg2 carries PCI information or part of PCI information corresponding to the UE. The notification is performed in one of the following manners.

In Manner 1, the PCI information is explicitly carried in Msg2. For example, when there are 1008 PCIs in New Radio (NR), it means that 10 bits may be used to indicate the PCI information. In addition, bits corresponding to part PCI may be carried, such as K bits representing PCI least significant bit fields (K is an integer, and 0<K<10).

In Manner 2, the scrambling code (RA-RNTI) used by the PDCCH indicating Msg2 needs to be determined according to the PCI of the first cell, for example, the RA-RNTI is defined according to the following manner.

The RNTI is determined by the index s of the first symbol of Msg1 in one slot (with a range of 0 to S−1), the index t of a slot in one radio frame (with a range of 0 to T−1), the frequency domain index f of Msg1 (with a range of 0 to F−1), the carrier index value c of Msg1 (with a range of 0 to C−1), and the index value of the cell where the application signal is located (for example, with a range of 0 to P−1), where S, T, F, C, and P are all positive integers, and the value of the RA-RNTI is as follows:

$$RA\text{-}RNTI = 1 + s + S*t + S*T*f + S*T*F*c + S*T*F*C*p.$$

Figure 10:
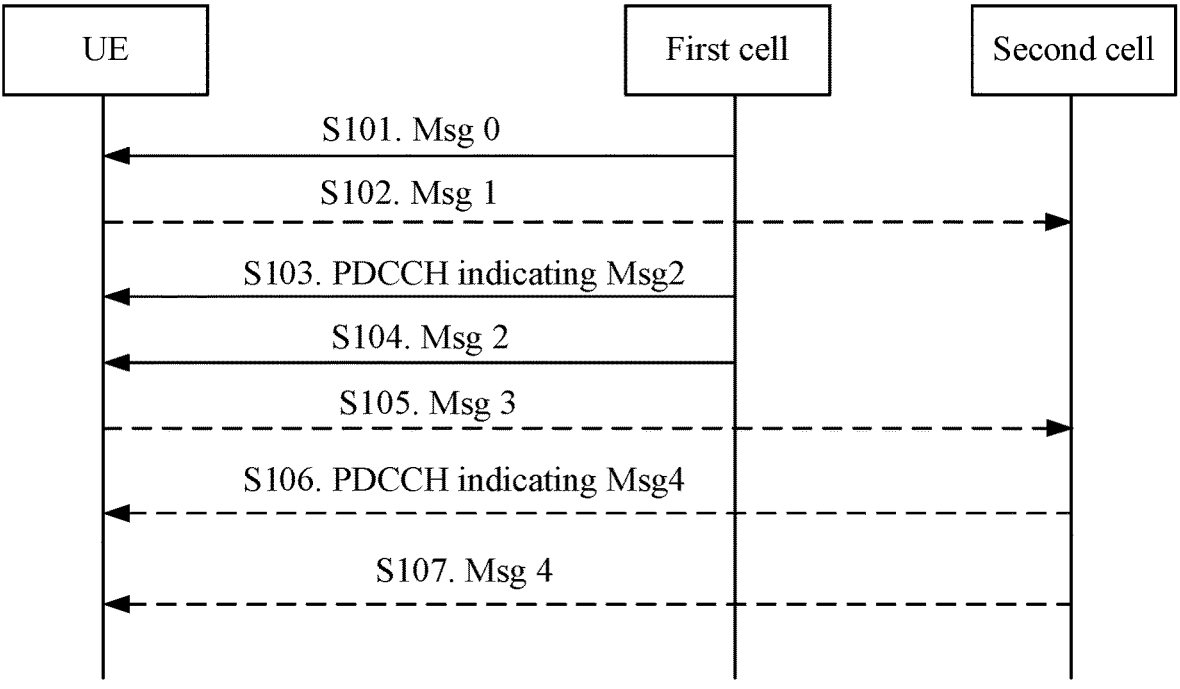
FIG. 10 is a flowchart of another method for applying for accessing a cell through a single application signal according to an embodiment of the present application.

In Manner 3, the PDCCH indicating Msg2 is sent by the first cell, where Msg2 itself has two possibilities: Msg2 is sent in the first cell or in the second cell. As shown in FIG. 10, the second cell is obtained through the following operations.

In S101, the UE receives synchronization signals of one or more first cells. The UE receives first system information of a synchronized first cell.

In S102, the UE determines a resource required for applying for the second cell according to the received system information and sends a first application signal on the resource.

In S103, the UE receives a PDCCH indicating a response signal of Msg1 from the first cell.

In S104, the UE receives Msg2 sent by the first cell according to the received PDCCH. The UE receives a response signal sent by the first cell, where if the application of the UE is accepted, the response signal at least includes a cell identifier of the first cell for indicating the application signal, uplink grant information, and the like.

In S105, the UE sends information such as the UE ID required for applying for the second cell on the resource determined in the previous operation.

In S103, the UE receives a PDCCH indicating a response signal of Msg3.

In S107, the UE receives Msg4 according to the received PDCCH. If the response signal indicates that the application of the UE has been accepted, meaning that the wireless connection between the UE and the second cell has been established, the UE may perform bidirectional communication with the network using the second cell.

Figure 11:
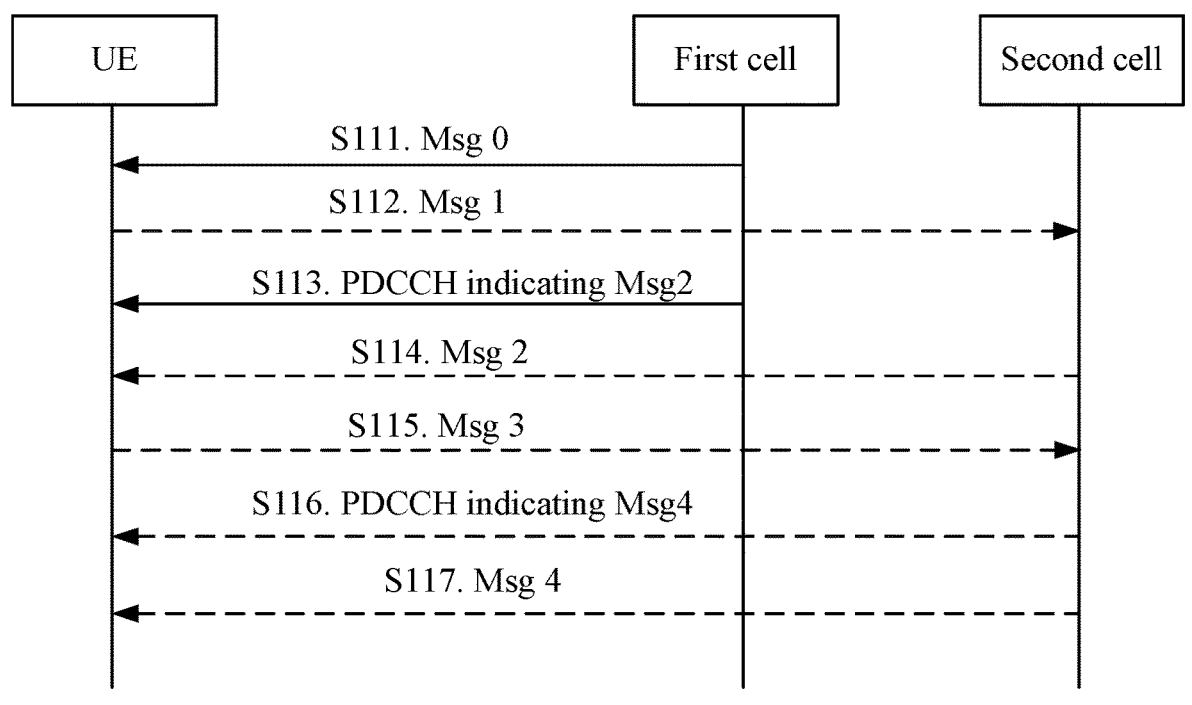
FIG. 11 is a flowchart of another method for applying for accessing a cell through a single application signal according to an embodiment of the present application.

As shown in FIG. 11, the second cell is obtained through the following operations.

In S111, the UE receives synchronization signals of one or more first cells. The UE receives first system information of a synchronized first cell.

In S112, the UE determines a resource required for applying for the second cell according to the received system information and sends a first application signal on the resource.

In S113, the UE receives a PDCCH indicating a response signal of Msg1 from the second cell.

In S114, the UE receives Msg2 sent by the second cell according to the received PDCCH. The UE receives a response signal sent by the second cell, where if the application of the UE is accepted, the response signal at least includes a cell identifier of the first cell for indicating the application signal, uplink grant information, and the like.

In S115, the UE sends information (represented by Msg3 in FIG. 11, the same below) such as the UE ID required for applying for the second cell on the resource determined in the previous operation.

In S116, the UE receives a PDCCH indicating a response signal (represented by Msg4 in FIG. 11, the same below) of Msg3.

In S117, the UE receives Msg4 according to the received PDCCH. If the response signal indicates that the application of the UE has been accepted, meaning that the wireless connection between the UE and the second cell has been established, the UE may perform bidirectional communication with the network using the second cell.

Accordingly, on the network side, in order to cooperate with the UE to apply for the second cell, the main work of the network includes the following.

1. The synchronization signal of the first cell is periodically sent in the first cell. The UE may achieve the downlink synchronization with at least one first cell using the synchronization signal. The system information of the first cell is periodically sent in the first cell. The system information at least carries the indication information of a resource required for applying for the second cell, frequency point information and bandwidth information of the second cell, and control resource set configuration information (resource set for sending the PDCCH). The resource required for applying for the second cell is in the bandwidth of the second cell.

2. Msg1 sent by the UE is received.

3. A PDCCH indicating a response signal (Msg2) of Msg1 is sent.

4. The response signal (Msg2) is sent.

5. Msg3 sent by the UE is received.

6. A PDCCH indicating Msg4 is sent.

7. Msg4 is sent.

Compared with the embodiments described above, in this embodiment, the UE accesses the second cell through fewer operations and does not need to apply to the second cell for sending the downlink synchronization signal, meaning that the UE can access the second cell faster. This embodiment is performed on the condition that the UE may receive the signal of the second cell using the downlink timing of the first cell. Then, after the UE accesses the second cell, the network may send the UE ID as required. In addition, this embodiment may also be applied to the embodiments described above, for example, operations 2 to 7 in this embodiment may replace corresponding operations in the embodiments described above.

Compared with the conventional four-step access method for the cellular system, the main difference between this embodiment and the conventional access method is as follows:

The response signal sent by the network to the UE carries one first cell identifier. With such a design, in one aspect, the application resources of the second cell are shared in a plurality of first cells, thereby enabling one second cell to serve the UEs in a plurality of first cells; in another aspect, the carrying of the first cell identifier can also achieve conflict resolution earlier, whereas in the conventional four-step access method for the cellular system, conflict resolution is achieved in the last step.

In this embodiment, the UE initiates an access application to the second cell through the system information of the first cell, while in the conventional four-step access method for the cellular system, the cell accessed by the UE and the cell corresponding to the system information are the same cell. In this embodiment, the first cell is a conventional cellular cell, and the second cell is a cell-free cell where APs are densely deployed, providing a better user experience after the UE accesses the second cell.

Figure 12:
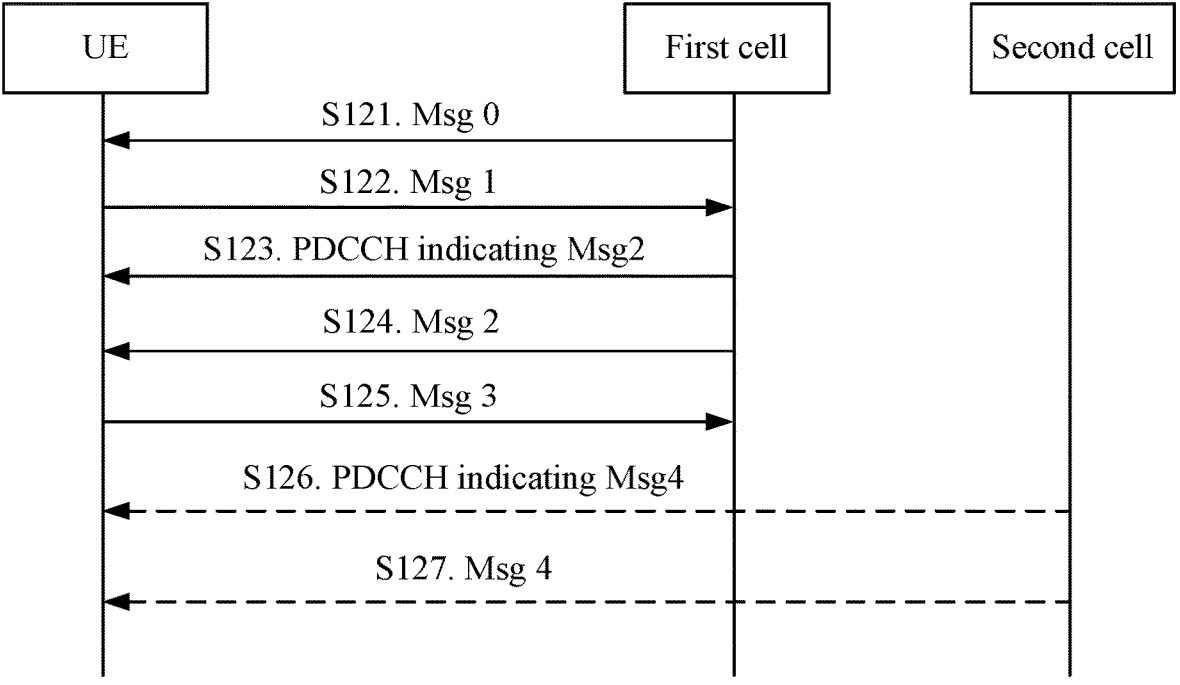
FIG. 12 is a flowchart of another method for applying for accessing a cell through a single application signal according to an embodiment of the present application.

The process where the UE obtains the second cell is as shown in FIG. 12. The main difference between the process and the embodiments described above is as follows:

As shown in FIG. 12, the second cell is obtained through S121 to S127.

In S121, the UE receives synchronization signals of one or more first cells. The UE receives first system information of a synchronized first cell.

In S122, the UE determines a resource required for applying for the second cell according to the received system information and sends a first application signal on the resource.

In S123, the UE receives a PDCCH indicating a response signal of Msg1 from the first cell.

In S124, the UE receives Msg2 sent by the first cell according to the received PDCCH. The UE receives a response signal sent by the first cell, where if the application of the UE is accepted, the response signal at least includes a cell identifier of the first cell for indicating the application signal, uplink grant information, and the like.

In S125, the UE sends information such as the UE ID required for applying for the second cell to the first cell on the resource determined in the previous operation.

In S126, the UE receives a PDCCH indicating a response signal of Msg3 from the second cell.

In S127, the UE receives Msg4 sent by the second cell according to the received PDCCH. If the response signal indicates that the application of the UE has been accepted, meaning that the wireless connection between the UE and the second cell has been established, the UE may perform bidirectional communication with the network using the second cell.

In the embodiments described above, the temporary cell (TC)-RNTI for scrambling Msg3 is the same as the TC-RNTI for scrambling a PDCCH of Msg4, and this RNTI is indicated in Msg2. In this embodiment, the TC-RNTI for scrambling Msg3 is different from the TC-RNTI for scrambling the PDCCH of Msg4, and there are the following mechanisms.

In Mechanism 1, Msg2 provides two TC-RNTIs, one is used for scrambling Msg3, and the other is used for scrambling the PDCCH indicating Msg4.

In Mechanism 2, Msg2 provides only one TC-RNTI as in the embodiments described above, and the TC-RNTI is used for scrambling Msg3. The second cell or target UE determines the RNTI for scrambling the PDCCH indicating Msg4 based on the TC-RNTI and the PCI of the first cell.

In Mechanism 3, Msg2 provides only one TC-RNTI as in the embodiments described above, and the TC-RNTI is used for scrambling the PDCCH indicating Msg4. The first cell/target UE determines the TC-RNTI for the Msg3 based on the TC-RNTI and the PCI of the first cell.

Another difference between this embodiment and the embodiments described above is that the PDCCH indicating Msg4 and Msg4 are all sent in the second cell.

Figure 13:
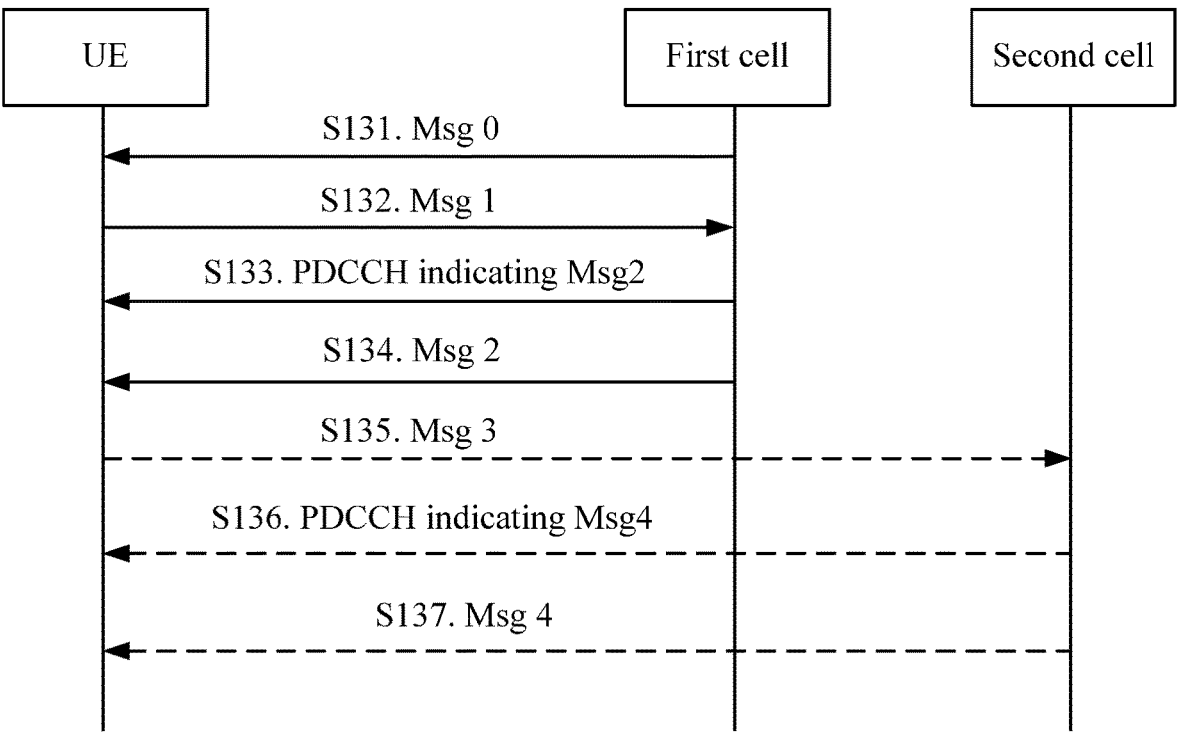
FIG. 13 is a flowchart of another method for applying for accessing a cell through a single application signal according to an embodiment of the present application.

In an example embodiment, the process where the UE obtains the second cell is as shown in FIG. 13.

In S131, the UE receives synchronization signals of one or more first cells. The UE receives first system information of a synchronized first cell.

In S132, the UE determines a resource required for applying for the second cell according to the received system information and sends a first application signal on the resource.

In S133, the UE receives a PDCCH indicating a response signal of Msg1 from the first cell.

In S134, the UE receives Msg2 sent by the first cell according to the received PDCCH. The UE receives a response signal sent by the first cell, where if the application of the UE is accepted, the response signal at least includes a cell identifier of the first cell for indicating the application signal, uplink grant information, and the like.

In S135, the UE sends information such as the UE ID required for applying for the second cell to the first cell on the resource determined in the previous operation.

In S136, the UE receives a PDCCH indicating a response signal of Msg3 from the second cell.

In S137, the UE receives Msg4 sent by the second cell according to the received PDCCH. If the response signal indicates that the application of the UE has been accepted, meaning that the wireless connection between the UE and the second cell has been established, the UE may perform bidirectional communication with the network using the second cell.

Compared with the embodiments described above, the main feature of this embodiment is that Msg3, the PDCCH indicating Msg4, and Msg4 are all sent between the UE and the second cell. The signal before MSG3 is sent between the UE and the first cell.

The advantage of this scheme is that Msg3, the PDCCH indicating Msg4, and Msg4 can be scrambled by using the same TC-RNTI without causing collision so that each media access control random access response (MAC RAR) in Msg2 only needs to carry one TC-RNTI.

One Msg2 may include multiple MAC RARs, and in this case, Msg2 and the PDCCH indicating Msg2 are more like multicast signals. For the sake of efficiency, it is more appropriate for Msg2 and the PDCCH indicating Msg2 to be sent by cellular, because if they are sent by the second cell in a UE-specific manner, considering the overhead of cyclic redundancy check (CRC), they may consume more resources.

Figure 14:
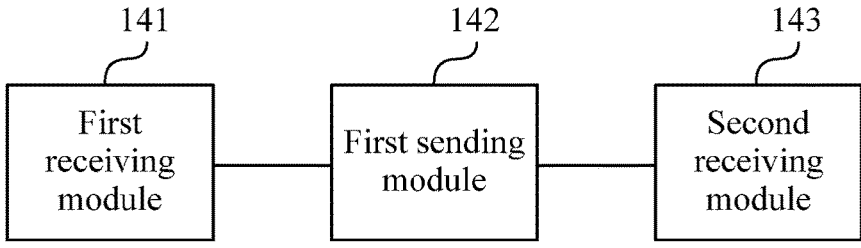
FIG. 14 is a structural schematic diagram of a cell access apparatus according to an embodiment of the present application.

In an embodiment, a cell access apparatus is provided. The apparatus is applied to a first node, and as shown in FIG. 14, the cell access apparatus provided by this embodiment of the present application mainly includes a first receiving module 141, a first sending module 142 and a second receiving module 143.

The first receiving module 141 is configured to receive a first synchronization signal and first system information sent by a second node in a first cell, where the first synchronization signal is used for downlink synchronization between the first node and the first cell, the first system information carries first resource indication information, and the first resource indication information is used for indicating a resource required for sending a first application signal. The first sending module is configured to send the first application signal, where the first application signal is used for requesting the second node to send first information. The second receiving module 143 is configured to receive the first information, where the first information is used for instructing the first node to access a second cell based on the first information.

In an example embodiment, the first application signal is sent in the first cell, or the first application signal is sent in the second cell.

In an example embodiment, in a case where the first application signal is sent in the first cell, the first application signal carries measurement result information of a first cell synchronization signal or location information of a UE.

In an example embodiment, in a case where the first application signal is sent in the second cell, the first application signal carries a sequence pre-configured by a network.

In an example embodiment, the operation where the first information is received includes: a first response signal is received, where the first response signal is a response signal of the first application signal.

In an example embodiment, the operation where the first node accesses the second cell based on the first information includes: a second synchronization signal is received, where the second synchronization signal is used for downlink synchronization between the first node and the second cell; second system information is received, where the second system information carries second resource indication information, and the second resource indication information is used for indicating a resource required for sending a second application signal; the second application signal is sent, where the second application signal is used for uplink synchronization between the first node and the second cell; and a second response signal is received, where the second response signal carries information allowing the access of the first node.

In an example embodiment, the operation where the second synchronization signal is received includes: the second synchronization signal is received at a frequency domain location of the second synchronization signal; where the frequency domain location of the second synchronization signal is determined by frequency domain location information carried in the first information, or the frequency domain location of the second synchronization signal is determined by a frequency domain location of the first synchronization signal and a preset relationship.

In an example embodiment, the operation where the first node accesses the second cell based on the first information includes: a first PDCCH of a first response signal is received; the first response signal is received based on the first PDCCH, where the first response signal carries a cell identifier of the first cell and uplink grant information; a third application signal is sent on a resource determined by the uplink grant information, where the third application signal carries information required for applying for the second cell; a second PDCCH of the third response signal is received, where the third response signal is a response signal of the third application signal; and the third response signal is received based on the second PDCCH, where the third response signal carries information allowing the access of the first node.

In an example embodiment, the operation where the first PDCCH of the first response signal is received includes: the first PDCCH of the first response signal is received in the first cell.

In an example embodiment, the operation where the first response signal is received includes: the first response signal is received in the first cell, or the first response signal is received in the second cell.

In an example embodiment, the first PDCCH is scrambled by using a first RNTI.

In an example embodiment, the third application signal and the second PDCCH are scrambled by using a second RNTI, where the first RNTI and the second RNTI are same or the first RNTI and the second RNTI are different.

In an example embodiment, the first response signal carries the first RNTI and the second RNTI that are different from each other.

In an example embodiment, the first response signal carries the first RNTI; the second RNTI is determined by the first RNTI and the cell identifier of the first cell or the first response signal carries the second RNTI; and the first RNTI is determined by the second RNTI and the cell identifier of the first cell.

Figure 15:
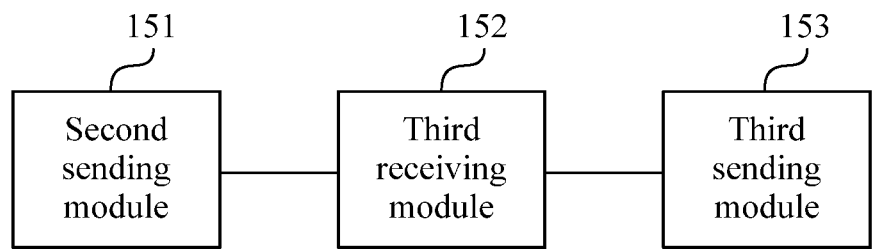
FIG. 15 is a structural schematic diagram of a cell access apparatus according to an embodiment of the present application.

In an embodiment, a cell access apparatus is provided. The apparatus is applied to a second node, and as shown in FIG. 15, the cell access apparatus provided by this embodiment of the present application mainly includes a second sending module 151, a third receiving module 152 and a third sending module 153.

The second sending module 151 is configured to periodically send a first synchronization signal and first system information in a first cell, where the first synchronization signal is used for downlink synchronization between a first node and the first cell, the first system information carries first resource indication information, and the first resource indication information is used for indicating a resource required for sending a first application signal. The third receiving module 152 is configured to receive the first application signal, where the first application signal is used for requesting the second node to send first information. The third sending module 153 is configured to send the first information, where the first information is used for instructing the first node to access a second cell based on the first information.

In an example embodiment, in a case where the first information is a first response signal, the apparatus further performs the following operations: a second synchronization signal is sent, where the second synchronization signal is used for downlink synchronization between the first node and the second cell; second system information is sent, where the second system information carries second resource indication information, and the second resource indication information is used for indicating a resource required for sending a second application signal; the second application signal is received, where the second application signal is used for uplink synchronization between the first node and the second cell; and a second response signal is sent, where the second response signal carries information allowing the access of the first node.

In an example embodiment, in a case where the first information is a first PDCCH of a first response signal, the apparatus further performs the following operations: the first PDCCH of the first response signal is sent; the first response signal is sent, where the first response signal carries a cell identifier of the first cell and uplink grant information; a third application signal is received, where the third application signal carries information required for applying for the second cell; a second PDCCH of the third response signal is sent, where the third response signal is a response signal of the third application signal; and the third response signal is sent, where the third response signal carries information allowing the access of the first node.

The cell access apparatus provided by this embodiment can execute the cell access method provided by any of the embodiments of the present application and has functional modules and effects corresponding to the executed method. For technical details that are not described in detail in this embodiment, reference may be made to the cell access method provided by any of the embodiments of the present application.

Units and modules involved in the embodiments of the cell access apparatus are just divided according to functional logic, and the division is not limited to this, as long as the corresponding functions can be implemented. In addition, the names of functional units are just intended to distinguish and not to limit the scope of the present application.

Figure 16:
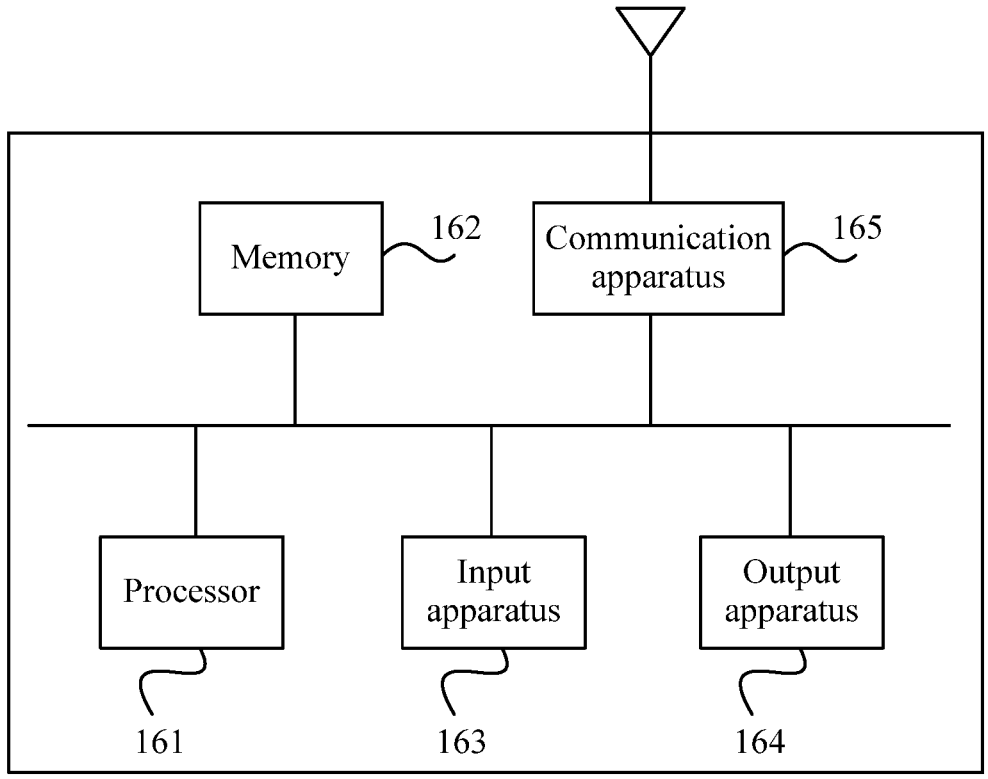
FIG. 16 is a structural schematic diagram of a device according to an embodiment of the present application.

The embodiments of the present application further provide a device. FIG. 16 is a structural schematic diagram of a device according to an embodiment of the present application. As shown in FIG. 16, the device includes a processor 161, a memory 162, an input apparatus 163, an output apparatus 164 and a communication apparatus 165. The number of processors 161 in the device may be one or more, and one processor 161 is illustrated in FIG. 16. The processor 161, the memory 162, the input apparatus 163 and the output apparatus 164 in the device may be connected to each other via a bus or in other ways, and the connection via a bus is illustrated in FIG. 16.

As a computer-readable storage medium, the storage device 162 may be configured to store software programs, computer-executable programs and modules such as program instructions/modules corresponding to the cell access method described in the embodiments of the present application (for example, the first receiving module 141, the first sending module 142 and the second receiving module 143 in the cell access apparatus) or program instructions/modules corresponding to the cell access method described in the embodiments of the present application (for example, the second receiving module 151, the third receiving module 152 and the third sending module 153 in the cell access apparatus). The processor 161 runs the software programs, instructions and modules stored in the memory 162 to perform function applications and data processing of the device, that is, to implement any of the cell access methods provided by the embodiments of the present application.

The memory 162 may mainly include a program storage region and a data storage region, where the program storage region may store an operating system and an application program required by at least one function while the data storage region may store data created depending on the use of the device. Furthermore, the memory 162 may include a high-speed random-access memory, and may also include a non-volatile memory such as at least one disk memory, flash memory or other non-volatile solid-state memories. In some examples, the memory 162 may include memories which are remotely disposed relative to the processor 161, and these remote memories may be connected to the device via a network. Examples of the preceding network include, but are not limited to, the Internet, an intranet, a local area network, a mobile communication network, and a combination thereof.

The input apparatus 163 may be used for receiving inputted digital or character information and for generating soft key signal input related to user settings and function control of the device. The output apparatus 164 may include display devices such as display screens.

The communication device 165 may include a receiver and a transmitter. The communication apparatus 165 is configured to perform information transceiving communication according to the control of the processor 161.

In a case where the device is the first node, the processor 161 executes programs stored in the system memory 162 to perform a variety of function applications and data processing, for example, to perform the cell access method provided by the embodiments of the present application. The method includes the following:

A first synchronization signal and first system information sent by a second node in a first cell are received, where the first synchronization signal is used for downlink synchronization between the first node and the first cell, the first system information carries first resource indication information, and the first resource indication information at least includes an indication for a resource required for sending a first application signal; the first application signal is sent, where the first application signal is used for requesting the second node to send first information; and the first information is received, where the first information is used for instructing the first node to access a second cell based on the first information.

The processor 161 may also perform the technical solutions of the cell access method provided by any of the embodiments of the present application. For the hardware structure and functions of the device, reference may be made to the content of the embodiments described above.

In a case where the device is the second node, the processor 161 executes programs stored in the system memory 162 to perform a variety of function applications and data processing, for example, to perform the cell access method provided by the embodiments of the present application. The method includes the following operations.

A first synchronization signal and first system information are periodically sent in a first cell, where the first synchronization signal is used for downlink synchronization between a first node and the first cell, the first system information carries first resource indication information, and the first resource indication information is used for indicating a resource required for sending a first application signal; the first application signal is received, where the first application signal is used for requesting the second node to send first information; and the first information is sent, where the first information is used for instructing the first node to access a second cell based on the first information.

The processor 161 may also perform the technical solutions of the cell access method provided by any of the embodiments of the present application. For the hardware structure and functions of the device, reference may be made to the content of the embodiments described above.

In an example embodiment, the embodiments of the present application further provide a storage medium including computer-executable instructions, where the computer-executable instructions are used for, when executed by a computer processor, performing a cell access method. The method is applied to the first node and includes the following:

A first synchronization signal and first system information sent by a second node in a first cell are received, where the first synchronization signal is used for downlink synchronization between the first node and the first cell, the first system information carries first resource indication information, and the first resource indication information at least includes an indication for a resource required for sending a first application signal; the first application signal is sent, where the first application signal is used for requesting the second node to send first information; and the first information is received, where the first information is used for instructing the first node to access a second cell based on the first information.

In the storage medium including computer-executable instructions provided by the embodiments of the present application, the computer-executable instructions implement not only the method operations described above but also related operations in the cell access method provided by the embodiments of the present application.

The embodiments of the present application further provide a storage medium including computer-executable instructions, where the computer-executable instructions are used for, when executed by a computer processor, performing a cell access method. The method is applied to the second node and includes the following:

A first synchronization signal and first system information are periodically sent in a first cell, where the first synchronization signal is used for downlink synchronization between a first node and the first cell, the first system information carries first resource indication information, and the first resource indication information is used for indicating a resource required for sending a first application signal; the first application signal is received, where the first application signal is used for requesting the second node to send first information; and the first information is sent, where the first information is used for instructing the first node to access a second cell based on the first information.

In the storage medium including computer-executable instructions provided by the embodiments of the present application, the computer-executable instructions implement not only the method operations described above but also related operations in the cell access method provided by the embodiments of the present application.

From the preceding description of the embodiments, the present application may be implemented by means of software and general-purpose hardware and may also be implemented by means of hardware. The technical solutions of the present application may essentially be embodied in the form of a software product. The software product in a computer may be stored in a computer-readable storage medium such as a floppy disk, read-only memory (ROM), random-access memory (RAM), flash memory, hard disk or optical disc in the computer and includes multiple instructions for enabling a computer device (which may be a personal computer, a server or a network device) to execute the methods of the embodiments of the present application.

The term user terminal encompasses any appropriate type of radio user device, such as a mobile phone, a portable data processing apparatus, a portable web browser or a vehicle-mounted mobile station.

In general, multiple embodiments of the present application may be implemented in hardware, a special-purpose circuit, software, logic, or any combination thereof. For example, some aspects may be implemented in hardware while other aspects may be implemented in firmware or software that may be executed by a controller, a microprocessor, or other computing apparatuses, though the present application is not limited thereto.

The embodiments of the present application may be implemented by computer program instructions executed by a data processor of a mobile apparatus, for example, in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps with logic circuits, modules, and functions. Computer programs may be stored in a memory. The memory may be in any type suitable for the local technical environment and may be implemented using any suitable data storage technology, for example, but not limited to, a read-only memory (ROM), a random-access memory (RAM), and an optical memory apparatus and system (a digital video disc (DVD) or a compact disk (CD)). Computer-readable media may include non-transitory storage media. The data processor may be of any type suitable to the local technical environment such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A cell access method, applied to a first node, comprising:

receiving a first synchronization signal sent by a second node in a first cell, wherein the first synchronization signal is used for downlink synchronization between the first node and the first cell;

after the first node is downlink synchronized with the first cell, receiving first system information sent by the second node in the first cell, wherein the first system information carries first resource indication information, and the first resource indication information at least comprises an indication for a resource required for sending a first application signal;

sending the first application signal on the resource required for sending the first application signal, wherein the first application signal is used for requesting the second node to send first information, wherein the first application signal is sent in the first cell and carries measurement result information of the first synchronization signal or location information of the first node, and wherein the measurement result information or the location information is used for the second node to organize a set of access points (APs) to form a second cell; and receiving the first information, wherein the first information is used for instructing the first node to access the second cell based on the first information, wherein the first cell is a common cell, the second cell is a UE-specific cell in a cell-free system, and the UE-specific cell is implemented by densely deployed distributed APs.

2. The method of claim 1, wherein receiving the first information comprises:

receiving a first response signal, wherein the first response signal is a response signal of the first application signal.

3. The method of claim 2, wherein the first node accessing the second cell based on the first information comprises:

receiving a second synchronization signal based on the first information, wherein the second synchronization signal is used for downlink synchronization between the first node and the second cell;

after the first node is downlink synchronized with the second cell, receiving second system information, wherein the second system information carries second resource indication information, and the second resource indication information is used for indicating a resource required for sending a second application signal;

sending the second application signal on the resource required for sending the second application signal, wherein the second application signal is used for uplink synchronization between the first node and the second cell; and receiving a second response signal, wherein the second response signal carries information allowing the first node to access the second cell.

4. The method of claim 3, wherein receiving the second synchronization signal comprises:

receiving the second synchronization signal at a frequency domain location of the second synchronization signal, wherein the frequency domain location of the second synchronization signal is determined by frequency domain location information carried in the first information or the frequency domain location of the second synchronization signal is determined by a frequency domain location of the first synchronization signal and a preset relationship.

5. The method of claim 1, wherein receiving the first information comprises:

receiving a first physical downlink control channel (PDCCH) of a first response signal; and wherein the first node accessing the second cell based on the first information comprises:

receiving the first response signal based on the first PDCCH, wherein the first response signal carries a cell identifier of the first cell and uplink grant information;

sending a third application signal on a resource determined by the uplink grant information, wherein the third application signal carries information required for applying for the second cell;

receiving a second PDCCH of a third response signal, wherein the third response signal is a response signal of the third application signal; and receiving the third response signal based on the second PDCCH, wherein the third response signal carries information allowing the first node to access the second cell.

6. The method of claim 5, wherein receiving the first PDCCH of the first response signal comprises:

receiving the first PDCCH of the first response signal in the first cell.

7. The method of claim 5, wherein receiving the first response signal comprises:

receiving the first response signal in the first cell or receiving the first response signal in the second cell.

8. The method of claim 5, wherein the first PDCCH is scrambled by using a first radio network temporary identity (RNTI).

9. The method of claim 8, wherein the third application signal and the second PDCCH are scrambled by using a second RNTI, wherein the first RNTI and the second RNTI are same or the first RNTI and the second RNTI are different.

10. The method of claim 9, wherein the first response signal carries the first RNTI and the second RNTI that are different from each other.

11. The method of claim 9, wherein the first response signal carries the first RNTI; the second RNTI is determined by the first RNTI and the cell identifier of the first cell or the first response signal carries the second RNTI; and the first RNTI is determined by the second RNTI and the cell identifier of the first cell.

12. A cell access method, applied to a second node, comprising:

periodically sending a first synchronization signal and first system information in a first cell, wherein the first synchronization signal is used for downlink synchronization between a first node and the first cell, the first system information carries first resource indication information, and the first resource indication information is used for indicating a resource required for sending a first application signal;

receiving the first application signal, wherein the first application signal is used for requesting the second node to send first information and the first application signal carries measurement result information of the first synchronization signal or location information of the first node;

organizing a set of access points (APs) to form a second cell based on the measurement result information or the location information; and sending the first information, wherein the first information is used for instructing the first node to access the second cell based on the first information, wherein the first cell is a common cell, the second cell is a UE-specific cell in a cell-free system, and the UE-specific cell is implemented by densely deployed distributed AP.

13. The method of claim 12, in a case where the first information is a first response signal, further comprising:

sending a second synchronization signal, wherein the second synchronization signal is used for downlink synchronization between the first node and the second cell;

sending second system information, wherein the second system information carries second resource indication information, and the second resource indication information is used for indicating a resource required for sending a second application signal;

receiving the second application signal, wherein the second application signal is used for uplink synchronization between the first node and the second cell; and sending a second response signal, wherein the second response signal carries information allowing the first node to access the second cell.

14. The method of claim 12, in a case where the first information is a first physical downlink control channel (PDCCH) of a first response signal, further comprising:

sending the first PDCCH of the first response signal; and wherein the method further comprises:

sending the first response signal, wherein the first response signal carries a cell identifier of the first cell and uplink grant information;

receiving a third application signal, wherein the third application signal carries information required for applying for the second cell;

sending a second PDCCH of a third response signal, wherein the third response signal is a response signal of the third application signal; and sending the third response signal, wherein the third response signal carries information allowing the first node to access the second cell.

15. A device, comprising:

at least one processor; and a memory, which is configured to store at least one program;

wherein the at least one program, when executed by the at least one processor, cause the at least one processor to perform operations, the operations comprising:

receiving a first synchronization signal sent by a second node in a first cell, wherein the first synchronization signal is used for downlink synchronization between a first node and the first cell;

after the first node is downlink synchronized with the first cell, receiving first system information sent by the second node in the first cell, wherein the first system information carries first resource indication information, and the first resource indication information at least comprises an indication for a resource required for sending a first application signal;

sending the first application signal on the resource required for sending the first application signal, wherein the first application signal is used for requesting the second node to send first information, wherein the first application signal is sent in the first cell and carries measurement result information of the first synchronization signal or location information of the first node, and wherein the measurement result information or the location information is used for the second node to organize a set of access points (APs) to form a second cell; and receiving the first information, wherein the first information is used for instructing the first node to access the second cell based on the first information, wherein the first cell is a common cell, the second cell is a UE-specific cell in a cell-free system, and the UE-specific cell is implemented by densely deployed distributed APs.

\* \* \* \* \*